(12) United States Patent  
Skala et al.

(10) Patent No.: US 6,238,815 B1  
(45) Date of Patent: May 29, 2001

(54) THERMALLY INTEGRATED STAGED METHANOL REFORMER AND METHOD

(75) Inventors: Glenn William Skala, Churchville; David James Hart-Predmore; William Henry Pettit, both of Rochester; Rodney Lynn Borup, East Rochester, all of NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/187,125

(22) Filed: Nov. 5, 1998

Related U.S. Application Data

(63) Continuation-in-part of application No. 09/124,487, filed on Jul. 29, 1998, now abandoned.

(51) Int. Cl.⁷ .................................. H01M 8/06; B01J 8/04
(52) U.S. Cl. .......................... 429/17; 429/20; 422/189; 422/200; 422/202
(58) Field of Search .................................. 422/189, 190, 422/198, 200, 202, 236; 429/17, 20

(56) References Cited

U.S. PATENT DOCUMENTS

| | | | |
|---|---|---|---|
| 3,142,545 | * | 7/1964 | Raarup et al. . |
| 4,046,956 | * | 9/1977 | Fanciullo ............................ 429/20 |
| 4,365,006 | * | 12/1982 | Baker .................................. 429/17 |
| 4,650,727 | | 3/1987 | Vanderborgh et al. ............ 429/19 |
| 4,670,359 | * | 6/1987 | Beshty et al. ...................... 429/17 |
| 5,019,356 | * | 5/1991 | Silberring ..................... 422/198 X |
| 5,167,933 | * | 12/1992 | Norsk ........................... 422/189 X |
| 5,248,566 | * | 9/1993 | Kumar et al. .................. 429/17 X |
| 5,458,857 | * | 10/1995 | Collins et al. .................... 422/198 |
| 5,753,194 | * | 5/1998 | Heil et al. ......................... 422/190 |
| 6,077,620 | * | 6/2000 | Pettit ................................. 429/26 |

* cited by examiner

Primary Examiner—Stephen Kalafut  
(74) Attorney, Agent, or Firm—Lawrence B. Plant

(57) ABSTRACT

A thermally integrated two-stage methanol reformer including a heat exchanger and first and second reactors colocated in a common housing in which a gaseous heat transfer medium circulates to carry heat from the heat exchanger into the reactors. The heat transfer medium comprises principally hydrogen, carbon dioxide, methanol vapor and water vapor formed in a first stage reforming reaction. A small portion of the circulating heat transfer medium is drawn off and reacted in a second stage reforming reaction which substantially completes the reaction of the methanol and water remaining in the drawn-off portion. Preferably, a PrOx reactor will be included in the housing upstream of the heat exchanger to supplement the heat provided by the heat exchanger.

34 Claims, 15 Drawing Sheets

THERMALLY INTEGRATED STAGED METHANOL REFORMER AND METHOD

This is a continuation in part of United States patent application U.S. Ser. No. 09/124,487 filed Jul. 29, 1998 in the names of Skala et al and assigned to the assignee of this application and now abandoned.

The Government of the United States of America has rights in this invention pursuant to Agreement No. DE-AC02-90CH10435 awarded by the U.S. Department of Energy.

TECHNICAL FIELD

The present invention relates to a fuel processor for an $H_2$-fueled fuel cell and method of operating same in a thermally integrated manner.

BACKGROUND OF THE INVENTION

Fuel cells have been proposed for many applications including electrical vehicular power plants to replace internal combustion engines. Hydrogen is often used as the fuel and is supplied to the fuel cell's anode. Oxygen (as air) is the cell's oxidant and is supplied to the cell's cathode.

The hydrogen used in the fuel cell can be derived from the reforming of methanol in a catalytic reactor known as a reformer. In the methanol reforming process, methanol and water (vapors) are ideally reacted under isothermal conditions to generate hydrogen and carbon dioxide according to the following endothermic reaction:

$$CH_3OH + H_2O \rightarrow CO_2 + 3H_2$$

This reaction is carried out within a reformer that is heated by exhaust gases from a methanol-fired or hydrogen-fired combuster, and yields a reformate gas comprising hydrogen, carbon dioxide, carbon monoxide, and water. One such reformer is described in U.S. Pat. No. 4,650,727 to Vanderborgh, and one such combuster is described in copending United States patent applications U.S. Ser. No. 08/975,422 (abandoned) and Ser. No. 08/980,087 now U.S. Pat. No. 6,077,620, filed in the name of William Pettit in November 1997, and assigned to General Motors Corporation, assignee of the present invention. Carbon monoxide is contained in the $H_2$-rich reformate/effluent exiting the reformer, and must be removed, or reduced to very low concentrations (i.e., less than about 20 ppm), which are nontoxic to the catalyst in the anode of the fuel cell.

It is known that the carbon monoxide, CO, content of the reformate can be reduced by the a so-called "water-gas shift" reaction which can take place within the reformer itself (depending on the operating conditions of the reformer), or in a separate shift reactor downstream from the reformer. In the water-gas shift reaction, water (i.e., steam) reacts with the carbon monoxide according to the following ideal endothermic shift reaction:

$$CO + H_2O \rightarrow CO_2 + H_2$$

Some CO still survives the water-gas shift reaction and needs to be reduced to below about 20 ppm before the reformate can be supplied to the fuel cell. It is known to further reduce the CO content of $H_2$-rich reformate by reacting it with air in a so-called "PrOx" (i.e., preferential oxidation) reaction carried out in a catalytic PrOx reactor. In the PrOx reactor, air preferentially oxidizes the CO in the presence of the $H_2$, but without consuming/oxidizing substantial quantities of the $H_2$. The PrOx reaction is exothermic and proceeds as follows:

$$CO + \tfrac{1}{2}O_2 \rightarrow CO_2$$

The PrOx reactor effluent is then supplied to the fuel cell.

For vehicular power plants, these reactions must be carried out as efficiently as possible and in the most compact space possible. This requires optimal use of available heat to maintain reactor temperatures at their operating temperatures.

SUMMARY OF THE INVENTION

The present invention involves a unique thermally-integrated fuel processor including an isothermal reformer for the two stage conversion of methanol into a $H_2$-rich fuel gas for a fuel cell. A gaseous heat transfer medium comprising principally water vapor, methanol vapor, hydrogen and carbon dioxide formed in one stage of the reaction is circulated throughout the fuel processor to transfer heat within the fuel processor. The $H_2O_{(v)}$—$CH_3OH_{(v)}$—$H_2$—$CO_2$ medium is an excellent heat transfer medium having a higher heat carrying capacity than just $H_2O_{(v)}$ and/or $CH_3OH_{(v)}$. A small portion of the circulating medium is drawn off as an input stream to the second stage of the reaction which completes the reforming. More specifically, the invention contemplates a thermally-integrated fuel processor which includes a housing containing a heater, first and second stage catalytic reforming reactors for converting the methanol and water to hydrogen, and a fan that recirculates a gaseous heat transfer medium throughout the housing around and through the heater and first and second stage reforming reactors. During regular operation the medium comprises first concentrations of water vapor, hydrogen, carbon dioxide and methanol vapor formed in the first stage of the conversion reaction. During initial startup, the heat transfer medium comprises a startup gas such as hydrogen, carbon dioxide, or preferably an inert gas such as argon, helium or nitrogen. Water and methanol are injected from separate inlets, or a combined inlet, into the medium as it circulates within the housing. The heater is positioned in the housing downstream of the fan (i.e., in the direction of medium flow in the housing) for heating the circulating heat transfer medium sufficiently for the medium to heat the catalytic reactors which are located downstream of the heater. The first reactor is located downstream from the heater and endothermically converts a small portion of the heat transfer medium which is diverted from the recirculating medium into a reformate gas having second concentrations of hydrogen and carbon dioxide greater than the first concentrations, and concentrations of water and methanol vapors less than the first concentrations.

The first reactor includes a plurality of first and second channels separated and isolated each from the other by a thermally conductive partition defining the channels. The first plurality of channels are adapted to receive the diverted medium portion, and contain a first catalyst for effecting the conversion. The second plurality of channels have an inlet thereto adapted to admit heated medium from the heater into the second plurality of channels for heating the first catalyst in the first plurality of channels. The second plurality of channels also have an outlet for discharging the circulating medium from the second channels after it has heated the catalyst in the first plurality of channels. The first reactor is preferably a cross-flow reactor in which the first plurality of channels cause the diverted medium portion to flow therethrough in one direction, and the second plurality of channels cause the recirculating medium to flow therethrough in another direction transverse (e.g., normal to) the one direction. The general trend for the flow of the diverted medium within the first channels is preferably in the same direction as the flow of recirculating medium in the second channels (i.e., "co-flow" configuration). Most preferably, the first plurality of channels of the first reactor cause the medium portion to flow back and forth therethrough in a serpentine path for maximum residence time and insure substantially complete conversion of the methanol and water to hydrogen while at the same time the co-flow configuration causes the temperature in both the recirculating medium and diverted medium portion to decrease from one end of the reactor to the other thus producing favorable (i.e., cooler) conditions at the outlet of the first reactor for achieving lower CO concentrations.

The housing also encloses a second reactor which is located downstream from the heater, and preferably downstream from the first reactor. The second reactor receives and passes heated medium into direct contact with a second catalyst which promotes the endothermic reaction of some (e.g., about 20% to about 80%, and preferably 50% by vol.) of the water and methanol vapors in the heated medium to form principally hydrogen and carbon dioxide in the medium. Some carbon monoxide is also produced.

A shunt within the housing diverts a small (e.g., up to about 25% by vol.) portion of the circulating medium into the first plurality of channels of the first reactor where the second stage reaction occurs in the formation of the reformate. The diverted portion will preferably comprise about 5% by volume of the recirculating medium and is determined by the rate at which fresh water and methanol are introduced into the housing.

In a preferred embodiment, the heater comprises a fluid-fluid heat exchanger having a hot side including a plurality of first conduits through which a heating fluid flows, a cold side including a plurality of second conduits through which the system's circulating heat transfer medium flows to be heated, and a thermally conductive barrier defining the respective conduits and separating the hot and cold sides from each other. The second conduits defining the cold side of the heat exchanger have an inlet for receiving the circulating heat transfer medium and an outlet for exhausting the circulating heat transfer medium therefrom. Preferably, the heat exchanger is a cross flow exchanger adapted to flow the circulating heat transfer medium through the cold side second conduits in a first direction and the heating fluid through the hot side first conduits in a second direction transverse (e.g., normal to) the first direction. Most preferably, the heating fluid will comprise combustion products exhausted from a combuster fueled by methanol and/or unused hydrogen exiting the anode compartments of the fuel cell that is fueled by the fuel processor.

In accordance with a preferred embodiment of the invention, the housing has a central longitudinal axis and the fan, reactors and heat exchanger are aligned along the central axis with the fan being configured and arranged so as to circulate the heat transfer medium around and through the reactors and heat exchanger. Preferably, the fan is positioned at one end of the housing so as to draw the medium through the heat exchanger and reactors along the central longitudinal axis and discharge the medium around the reactors and heat exchanger such that they are substantially completely surrounded by the heat transfer medium for reduced heat loss from the heat exchanger and reactors. The water/methanol is preferably injected into the housing so as to impinge on the fan's impeller to aid in atomization of the water/methanol for quick vaporization in the circulating heat transfer medium. Most preferably, the impeller comprises a plate having (1) a front face, (2) a back face, and (3) a plurality of blades carried on the front face of the plate and curving generally radially from the center of the impeller, where the medium enters the impeller, to near the perimeter of the plate where the medium exits the impeller. The water/methanol inlet(s) is/are preferably configured and arranged to impinge the water/methanol onto the back face of the impeller, which most preferably, includes a plurality of generally radially extending, upstanding veins that reduce the axial load on the impeller and promote atomization of the water/methanol impinging onto the plate.

The present invention also contemplates a two-stage method for steam reforming methanol. During normal operations, the preferred method involves: (a) providing a gaseous heat transfer medium comprising a first concentration of water vapor, hydrogen, carbon dioxide and methanol vapor; (b) positioning a gas-to-gas heat exchanger upstream from a first catalytic reactor, and a second catalytic reactor in a housing, wherein the first reactor has a plurality of first channels containing a first catalyst suitable for promoting reaction between the water and methanol vapors in a portion of the heat transfer medium diverted therethrough, and a plurality of second channels in heat exchange relationship with the first channels, and the second reactor has a second catalyst suitable for promoting reaction between the water vapor and methanol vapors in the bulk of the heat transfer medium flowing through the catalyst; (c) circulating the medium within the housing sequentially through the heater and the first and second reactors so as to substantially complete the water-methanol reaction in two-stages; (d) heating the circulating medium with the heat exchanger to a temperature sufficient for the circulating medium to heat the first and second catalysts to temperatures suitable for promoting the methanol-water reaction; (e) injecting methanol and water into the circulating medium; (f) reacting some (e.g. about 20%–80% by volume, and most preferably about 50%) of the water and methanol in the medium in a first stage reaction on the second catalyst; and (g) diverting a portion of the circulating medium through the first catalyst to react the methanol and water in such portion to form a reformate gas having second concentrations of hydrogen, and carbon dioxide greater than the first concentrations, and concentrations of water and methanol vapors less than the first concentrations in the recirculating medium. The portion of the medium withdrawn into the first catalyst preferably comprises up to about 25% by volume of the circulating medium, and most preferably about 5% by volume of the recirculating medium. Preferably, the second reactor is downstream of the first reactor and receives medium exiting from the first reactor. Alternatively, the medium may enter the second catalyst immediately upon exiting the heater and before it passes into the first reactor. Preferably, a PrOx reactor is located within the housing to supplement the heat provided by the heat exchanger with heat generated by the exothermic PrOx reaction and thereby reduce the size of the heat exchanger. The precise location of the PrOx reactor in the housing will depend on the temperature at which the PrOx reactor operates, which in turn, depends on the catalyst used therein. Most preferably, the PrOx reactor will be positioned upstream of the heat exchanger and operate at a temperature which is lower than that of the heat exchanger to minimize the occurrence of the reverse water-gas shift reaction.

In accordance with another aspect of the present invention, the two stage fuel processor is initially started up by preheating it to the desired operating temperature before any methanol or water are injected into the housing and fuel processed. More specifically, at initial startup (i.e. before the system has been operated), the housing is filled with a startup gas which may be hydrogen or another gas such as carbon dioxide, helium, argon or nitrogen containing a small amount (e.g. about 3%) hydrogen to activate the catalyst. The starter gas will preferably be nitrogen. A methanol-fueled combuster supplies heated exhaust/combustion gases to the heat exchanger located in the housing. The fan is energized to recirculate the starter gas through the heat exchanger and reactors to bring the reactors up to the desired operating temperatures. The thermal output from the combuster is contgrolled in response to the interval temperature of the fuel processor. Once the desired reactor temperatures are achieved, methanol and water injection begins and eventually generates the desired heat transfer medium which displaces the starter gas. In the meantime, the reformate exiting the first reactor, although diluted with some starter gas, can still be used in the fuel cell during system startup so long as the CO levels are low enough. Alternatively, the diluted reformate could be diverted into the combuster for burning, or dumped to the atmosphere, if desired, until acceptable CO levels are achieved. On subsequent restarts of a fuel processor that has merely been shut down, the fan and the heater are energized to circulate the hydrogen and carbon dioxide remaining in the housing and to vaporize any water or methanol condensate in the housing. Once the desired operating temperatures are achieved, fresh methanol and water are again injected into the recirculating gas, and normal fuel processor operation resumes. CO output from the fuel processor is controlled over the operating range of the processor by varying the water/methanol ratio, the amount of air added to the PrOx reactor, and the speed of the recirculating fan to respectively drive the reaction equilibrium, oxidize the CO and maintain the required heat transfer within the processor.

BRIEF DESCRIPTION OF THE DRAWINGS

The invention will be better understood when considered in the light of the following detailed description of a preferred embodiment thereof which is given hereafter in conjunction with the several drawings in which.

DETAILED DESCRIPTION OF A PREFERRED EMBODIMENT OF THE INVENTION

Figure 1:
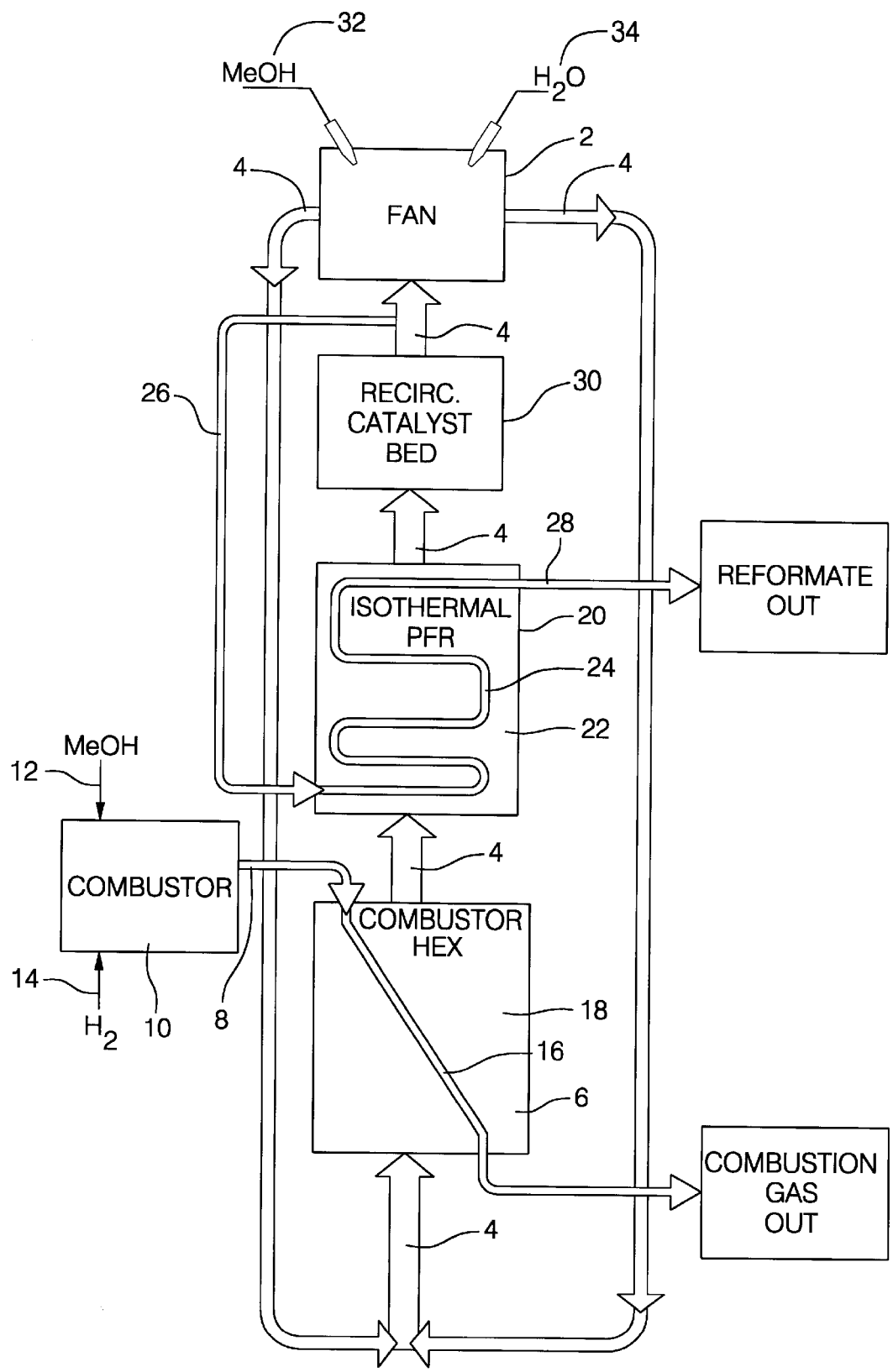
FIG. 1 is a schematic of one embodiment of the process of the present invention.

FIG. 1 schematically illustrates one embodiment of the process of the present invention, and the preferred positioning of the principal components (i.e., heater and reactors) of the invention. More specifically, FIG. 1 illustrates a recirculating fan 2 for circulating a gaseous heat transfer medium 4 within a sealed housing (not shown) such that the heat transfer medium 4 exiting the fan 2 enters a gas-to-gas heat exchanger 6 which is heated by exhaust gases 8 from a combuster 10 which is fueled by either methanol 12 from a methanol fuel tank and/or unused hydrogen 14 exiting the anode chambers of a fuel cell stack (not shown). The heat exchanger 6 includes a hot side 16 through which the hot combustion gases 8 flow, and a cold side 18 through which the heat transfer medium 4 flows and absorbs heat from the combustion gases. Alternatively, the heat exchanger 6 could be replaced with an electric heater which during startup or system idle is energized externally of the fuel cell system (e.g., from a household wall socket) during startup. After the system is up and running, the heater is energized with current from the fuel cell, albeit at the expense of energy otherwise available from the fuel cell for more useful purposes (e.g., powering an electric vehicle).

Heated medium 4 exits the heat exchanger 6 and enters a first reactor 20 which is essentially an isothermal, plug-flow type reactor wherein a slug of reactants makes a single pass through the reactor, as distinguished from a "stirred", "recycle" reflex type reactor where the reactants are reflected or make multiple passes through a reactor. In a stirred/recycle/reflex type reactor, a portion (e.g. up to 25%) of the circulating reactant stream is drawn off for further processing while the remainder continues to circulate through the reactor. Makeup reactants are then added to the recirculating reactants to compensate for those drawn off from the stream.

The reactor 20 comprises a heat exchanger having a hot side 22 through which the heated circulating medium 4 flows, and a cold side 24 containing a suitable first catalyst (not shown). A small portion (e.g. up to about 25% by volume and preferably about 5%) of the heat transfer medium 4 is shunted through the first catalyst to convert any residual water and methanol vapor therein to hydrogen and carbon dioxide which exits the reactor 20 as a reformate stream 28. The amount of medium shunted through the first catalyst is determined by, and in direct proportion to, the amount of makeup reactants (i.e., methanol and water) added to the circulating medium. The reformate stream 28 may thereafter further be subjected to a water-gas shift reaction and/or a preferential oxidation (PrOx) reaction as is well known to those skilled in the art in order to remove any excess carbon monoxide contained in the reformate stream. The heat transfer medium 4 exits the first reactor 20 and enters a second reactor 30 which is essentially a second bed of catalyst (a.k.a. recalculation catalyst bed) through which the heat transfer medium 4 flows in direct contact with the second catalyst to react a portion of the water vapor and methanol vapor contained in the medium 4 to form carbon dioxide and hydrogen in the circulating stream 4. Liquid methanol 32 and water 34 are injected into the housing, most preferably into the fan 2, to provide make-up for the gases exiting the housing as reformate stream 28.

The combustion gases 8 passing through the hot side 16 of the heat exchanger 6 heat the recirculating medium 4 to a temperature suitable for the circulating medium 4 to heat the reactor 20 sufficiently for it to carryout the methanol-water reaction set forth above. Combustion gases 8 from the combustor 10 enter the heat exchanger 6 at about 600 to 700° C. and exit at about 210 to 275° C. The temperature of the medium 4 exiting the heat exchanger 36 will depend on the nature, and hence needs, of the catalyst used in the reactors 20 and 30 and the proportion of the methanol-water reaction that it is to be performed in the reactor 20. Preferably, the temperature of the medium 4 exiting the heat exchanger 6 and entering the first reactor 20 will be about 260° C. in a system where about 50% methanol conversion occurs in each reactor 20 and 30 and each use a conventional copper-zinc catalyst. The methanol-water reaction occurring in the reactor 20 is endothermic hence causing the temperature of the circulating medium 4 to drop to about 250° C. as it exits the reactor 20 and enters the second reactor 30 which is adequate to heat the second catalyst bed therein sufficiently for it to promote the methanol and water reaction. Preferably, the second reactor is sized to react about 50% of the methanol and water content of the heating medium 4, and minimizes the amount of catalyst required by the whole system. The temperature of the medium 4 exiting the second catalyst 30 is about 240° C.

A portion of the recirculating medium 4 is diverted or shunted, into the cold side 24 of the first reactor 20 where the remaining water and methanol contained therein are reacted on the first catalyst. The portion 26 of the circulating medium 4 that is diverted/shunted into the first reactor 20 will comprise up to about 25% by volume of the recirculating heat transfer medium 4, and preferably about 5% by volume of the recirculating heat transfer medium 4. At the preferred 5% level, the two-stage reforming reaction is very efficiently effected using the minimum of total system catalyst.

The heat transfer medium 4 exiting the second reactor 30 is drawn into the fan 2, and exhausted therefrom around the heat exchanger 6, first reactor 20 and second reactor 30 before entering the heat exchanger 6 so as to bathe the heat exchanger 6 and reactors 20 and 30 in hot gas. The medium 4 enters the heat exchanger 6 at a temperature of about 200–220° C. For optimal dispersion and atomization of the methanol 32 and water 34 into the medium 4, each is injected into the housing at the fan 2, and preferably such that they impinge upon the impeller of the fan 2 which atomizes the droplets and accelerates their vaporization into the gaseous medium 4.

The reformate exiting the fuel processor as stream 28 will next have the carbon monoxide therein substantially removed (e.g., by water-gas shift and PrOx reactions) and then fed into the anode compartments of a hydrogen-oxygen fuel cell. Unconsumed hydrogen 14 exiting the anode compartment of the fuel cell may be used as fuel to fire the combuster 10, either alone or in combination with methanol from the methanol storage tank 12. Alternatively, the combuster 10 may be fueled solely by the methanol, especially during startup of the processor.

Figure 2:
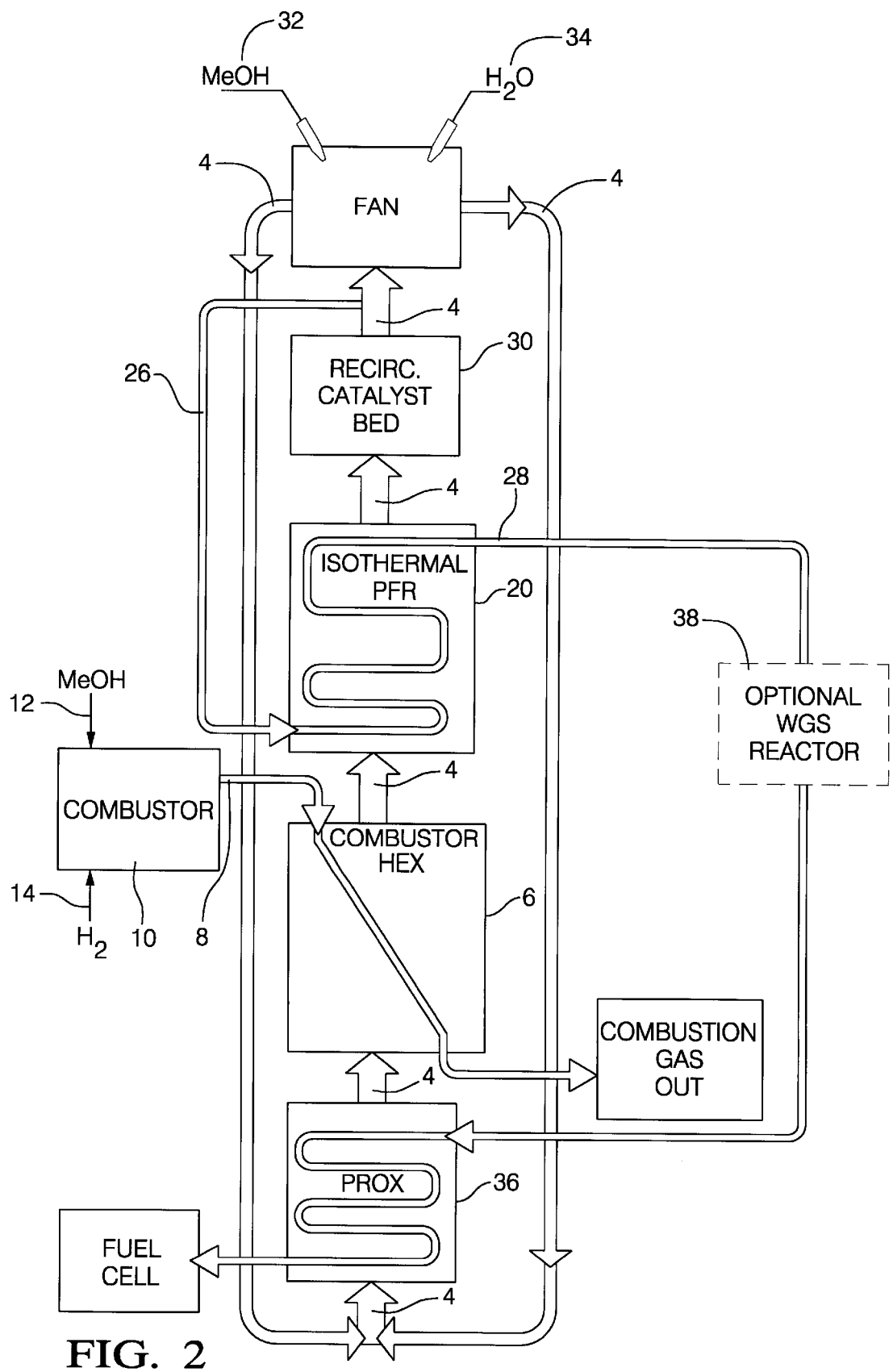
FIG. 2 is a schematic a preferred embodiment of the process of the present invention.

FIG. 2 depicts a preferred embodiment of the process of the present invention. FIG. 2 is similar to FIG. 1 but also includes a preferential oxidation (i.e., PrOx) reactor 36 within the housing of the heat exchanger 6. In the PrOx reactor 36, the reformate 28 exiting the first reactor 20 is reacted with oxygen/air under controlled conditions to preferentially oxidize any residual carbon monoxide in the reformate stream 28 without substantially consuming hydrogen in the reaction. PrOx reactors are known in the art and accordingly do not per se constitute a part of the present invention. The PrOx reaction is an exothermic reaction and adds heat to the heat transfer medium within the housing. Most preferably, the PrOx reactor operates at a lower temperature than the heat exchanger and is positioned upstream of the heat exchanger 6 so that the heat transfer medium 4 flows first into the PrOx reactor and then into the heat exchanger 6 so that the heat generated in the PrOx reactor can be utilized to reduce the heat load on the heat exchanger 6.

Optionally, a water-gas shift reactor 38 may be positioned in-line before the PrOx reactor 36 to pretreat the reformate 28 exhausting from the first reactor 20. Water-gas shift reactors are well known in the art and do not per se constitute part of the present invention. By properly controlling the reaction that occurs in the first and second reactors 20 and 30, respectively, the water-gas shift reaction can be caused to occur within the first and second reactors, and hence eliminate the need for a separate water-gas shift reactor 38.

Transients created by varying fuel demands of the fuel cell supplied by the fuel processor are preferably controlled by: (1) increasing or decreasing the amount of heat provided by the heat exchanger; (2) increasing or decreasing the flow rate and ratio of the methanol/water injected into the housing; and (3) varying the amount of air supplied to the PrOx reactor. Moreover, the speed of the fan can either be varied or held constant as the methanol and water throughput of the reformer varies. In this regard, varying the fan speed proportionally with the water/methanol throughput provides a constant temperature profile through the two reactors. On the other hand, a constant fan speed results in a variable temperature profile under transient load conditions.

Figure 3:
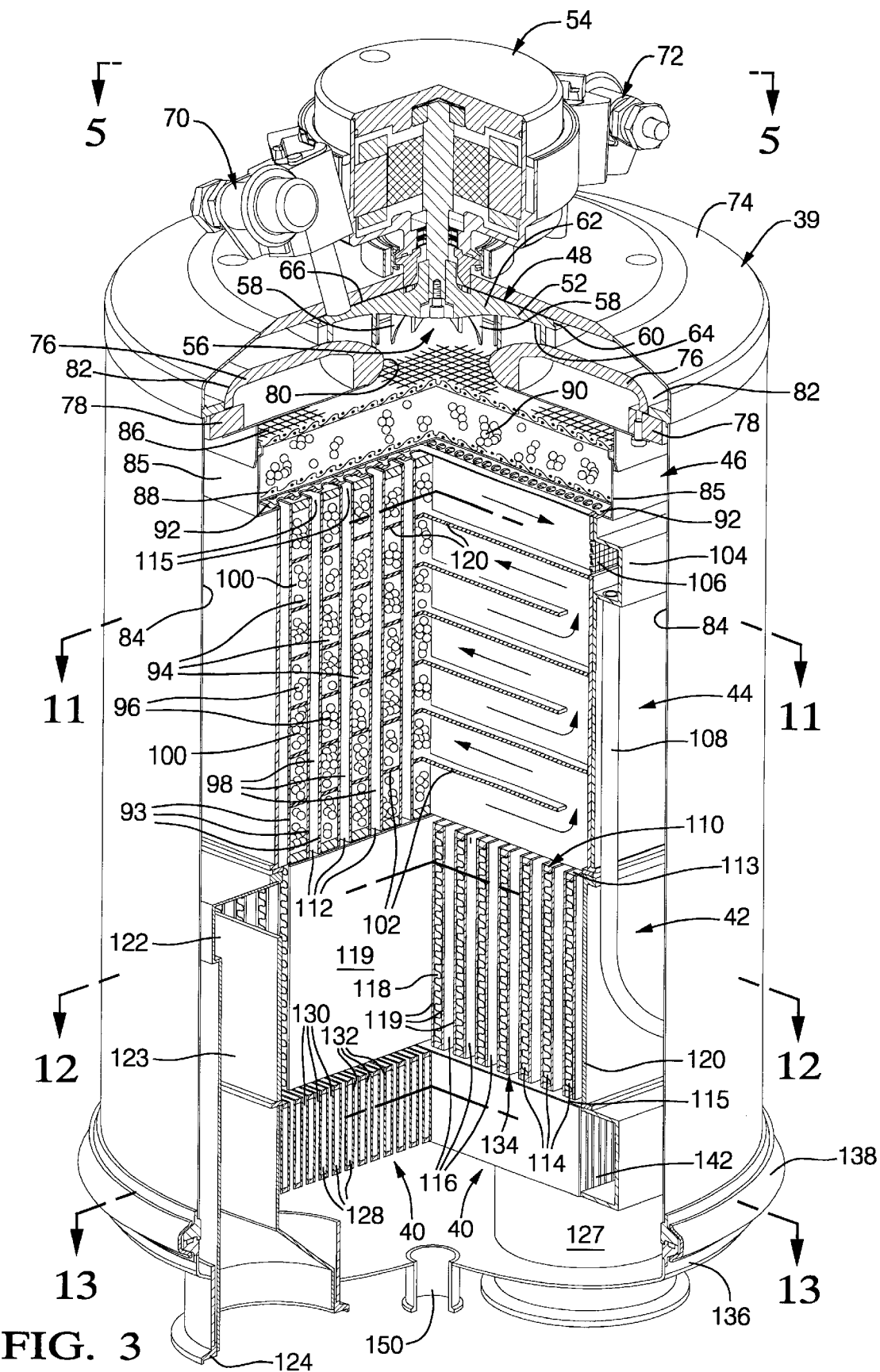
FIG. 3 is a partially broken away, isometrical view of a preferred methanol fuel processor according to the present invention.
Figure 6:
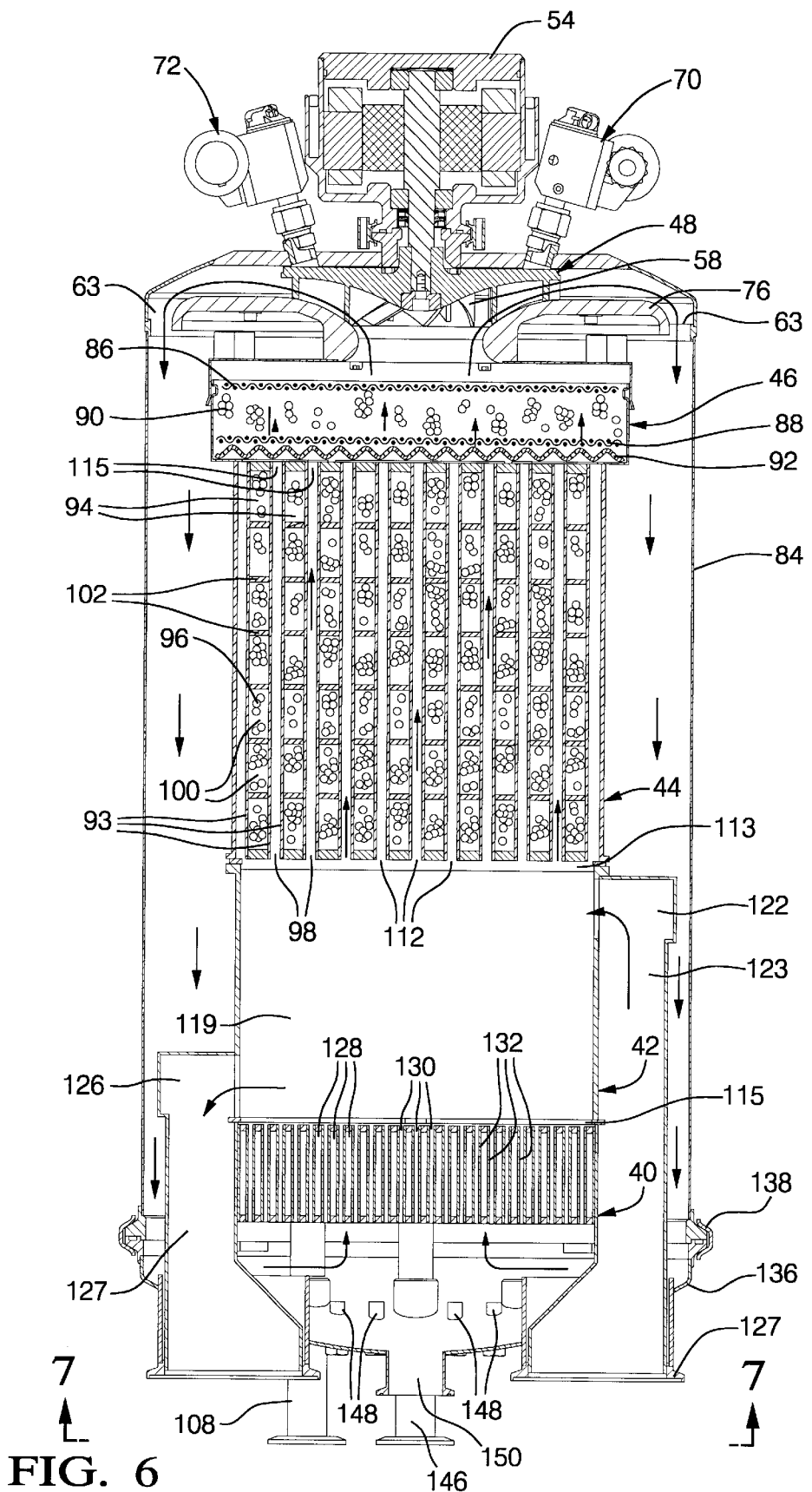
FIG. 6 is a sectioned side view in the direction 6—6 of FIG. 5.

Referring now in more detail to a specific structure for implementing the preferred embodiment of the present invention, FIG. 3 is a partially broken away isometrical view of a fuel processor 39 adapted to effectuate the process depicted in FIG. 2. More specifically, there is shown a fuel processor 38 having a number of distinct functional components including a PrOx reactor section 40, a combustion gas heat exchanger section 42, an isothermal plug flow reactor (i.e., first reactor) section 44, a second reactor section 46, and a fan 48 all located within, and along the central axis of, a sealed housing 50. The fan 48 comprises a rotating impeller 52 that circulates a heat transfer medium throughout the housing 50 and around the outsides of the PrOx reactor 40, the heat exchanger 42, the first reactor 44 and the second reactor 46 as shown by the arrows in FIG. 6. The impeller 52 is driven by a motor 54 and draws the circulating medium into its center 56. Blades 58 on the impeller 52 pump the circulating medium to the perimeter 60 of the impeller 52, and discharge it perimetrically therefrom. The impeller 52 preferably comprises a circular plate 62 having a front face 64 that carries the blades 58 and a back face 66 which carries a plurality of radially extending veins 68 which serve to reduce the axial load on the impeller 52 incident to the difference in pressure between the front and the back faces thereof, and to break up and atomize liquid methanol and water which are injected into the housing 50 through methanol injector 70 and water injector 72, respectively, so as to impinge onto the back face 66 of the plate 62. The impeller 52 flings liquid methanol and water onto the inside of the outer wall of the housing 50 where it first forms a thin film and then vaporizes and cools the outer wall. Alternatively the fan could be a squirrel cage fan or any other similar gas pump. Preferably, the methanol and water injectors 70 and 72 are conventional liquid injectors like the fuel injectors used in internal combustion engines. The fan 48 is secured to a cover 74 which is attached to one end of the housing 50 by clamping, welding or the like. An annular, don't-like baffle 76 is positioned in the housing 50 adjacent the blades 58 and is held in place by mounting blocks 78 secured to the housing 50 and located at four sites along the perimeter of the baffle 76. The baffle 76 has a central opening 80 through which the heat transfer medium is drawn into the impeller 62, and is spaced from the walls of the housing 50 at its perimeter 82 so as to provide an annular gap 63 (see FIG. 6) between it and the housing 50 such that air pumped by the fan 48 can circulate through the housing 50 along the wall 84 thereof and around the heat exchangers and several reactors located along the central axis of the fuel processor (see arrows in FIG. 6).

The second reactor 46 is positioned adjacent the baffle 76 and comprises a sheet metal container 85 having a pair of screens 86 and 88 at either end thereof and filled with catalyst beads 90. Reactor 46 is the catalytic reactor where the first stage of the reforming reaction occurs. The catalyst beads 90 preferably comprise a copper-zinc alloy commonly used for steam reforming methanol, and vary in size from about are about 4.2 mm in diameter by about 4 mm long. The screens 86 and 88 allow the heat transfer medium to pass therethrough and through the catalyst bed, while preventing the beads 90 from the catalyst bed from escaping the container 85. The screen 88 rests atop a perforated corrugated plate 92 that separates the second reactor 46 from the first reactor 44 and allows for a more uniform distribution of the circulating heat transfer medium through the bed of catalyst beads 90. In the second reactor 46, the heat transfer medium comes into direct contact with the catalyst beads 90 which serve to promote the reaction between some of the methanol vapor and water vapor contained within the heat transfer medium circulating through the housing 50. The catalyst composition, temperature and size of the second reactor 46 is preferably selected so as to react about 50% by volume of the methanol and water vapor in the circulating heat transfer medium. Though a higher or lower proportion can be achieved by adjusting the size of the catalyst bed, the 50% proportion results in a system that desirably utilizes the least amount of catalyst possible.

Figure 15:
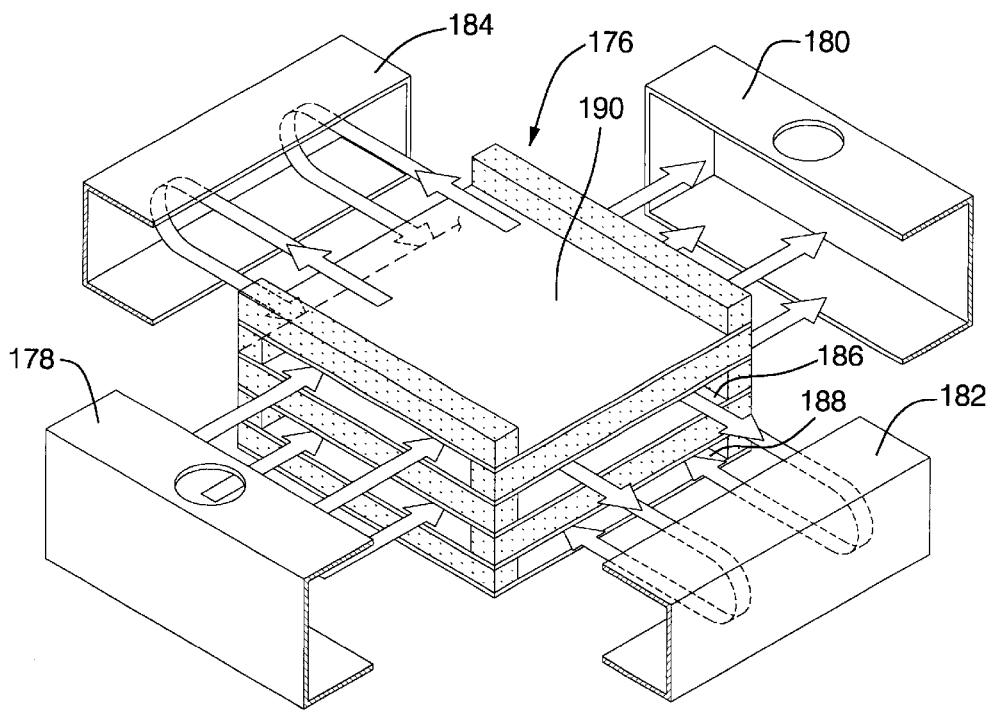
FIG. 15 is an exploded isometric illustration of a cross-flow reactor having a serpentine flow path.
Figure 16:
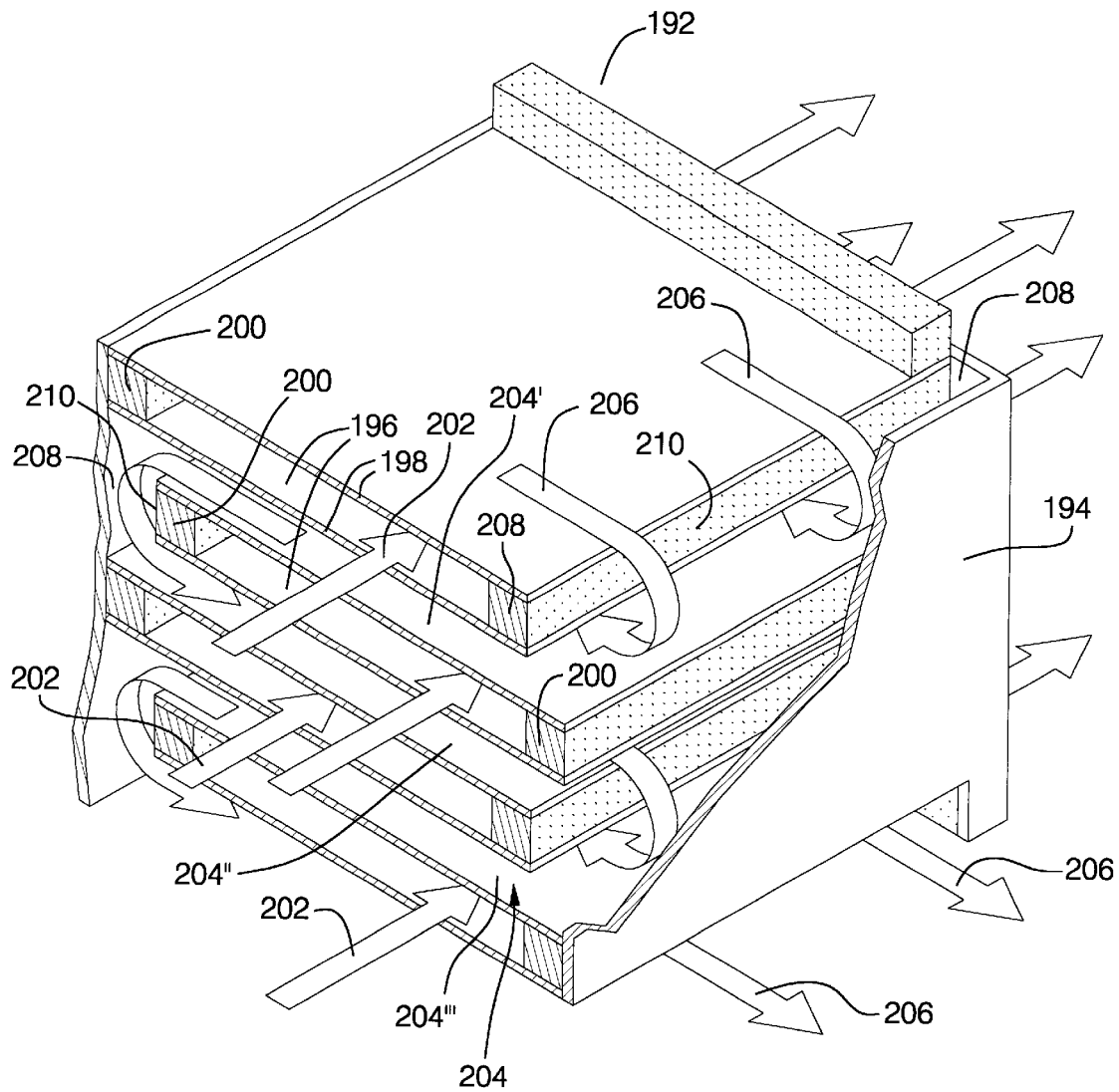
FIG. 16 is an isometric illustration of a preferred cross-flow reactor having a serpentine flow path therethrough.

Upstream of the second reactor 46 is the first reactor 44. The first reactor 44 is essentially a cross-flow, plate-and-bar type heat exchanger similar to those illustrated in FIGS. 14–16 wherein the general direction of flow of both the heat transfer medium and the diverted portion thereof is in the same direction as illustrated in FIG. 2 (i.e., co-flow). The reactor 44 includes a plurality of first channels 94 on its cold side through which a small portion of the heat transfer medium circulating within the housing 50 is shunted or drawn off from atop the second stage reaction and reacted on catalyst beads 96 (i.e. 1 mm dial by 1.5 mm long) contained within the first channels 94. In the embodiment shown, the portion of the medium that is diverted/shunted to the first reactor 44 is captured by a scoop 43 adjacent the top of the catalyst bed in the second reactor 46 so as to collect heat transfer medium which is freshly reacted in the second reactor 46, free of any entrained methanol or water droplets, and close to the operating temperature of the first reactor. The medium captured/collected by the scoop 43 flows through a shunt tube 45 to an inlet header 47 to the first reactor 44. In lieu of a scoop 43 and tube 45, the portion of the medium to be reacted can be drawn directly from the medium circulating around the first reactor by simply opening or exposing the catalyst-containing first channels of the first reactor to the surrounding medium stream, or otherwise drawing the portion of the medium from elsewhere in the housing 50. The first reactor 44 also contains second channels 98 on its hot side located interjacent the first channels 94, and through which the heat transfer medium flows to transfer heat from the heat transfer medium into the first channels 94 to heat the catalyst 96 therein for effecting the second stage reforming reaction. The second channels 98 have inlets 112 for receiving heated medium 4 from the heat exchanger 42, and outlets 115 for discharge cooler medium 4 into the second reactor 46. Thermally conductive partitions 93 separate the first channels 94 from the second channels 98. The first channels 94 are themselves divided into sections 100 by partitions 102 which are arranged in the reactor 44 so as to cause the portion of the heat transfer medium undergoing the second stage reforming reaction to move back and forth through the first reactor 44 in a serpentine fashion, as illustrated, to provide maximum residence time of such portion in contact with the catalyst beads 96 to insure complete reaction of the remaining methanol and water vapor in the drawn-off portion of the heat transfer medium. Alternative reactor designs for effecting such serpentine flow are illustrated in FIGS. 15 and 16 (described hereinafter)with that shown in FIG. 16 being preferred. Reformate exits the first reactor 44 through a manifold 104 which is separated from the catalyst 96 by a bead retaining screen 106. The reformate then exits the housing 50 via conduit 108.

The heat exchanger 42 is positioned adjacent the first reactor 44 such that the outlet 110 of the heat exchanger 42 confronts the inlets 112 to the second channels 98 of the first reactor 44 across a gap 113 where the heated gases mix and equilibrate for thermal uniformity before entering the first reactor 44. The heat exchanger 42 may be a cross-flow plate and bar type heat exchanger like that illustrated in FIG. 14 and has a hot side including a plurality of conduits 114 through which a heating fluid flows and a cold side including a plurality of second conduits 116 through which the heat transfer medium flows. Both sides (only one side shown) include a corrugated metal insert 118 exposed to the heating fluid to optimize the heat transfer therefrom. Similar inserts (not shown) are used in those portions of the first reactor and the PrOx reactor through which the heat transfer medium flows. The hot side and cold side of the heat exchanger are separated from each other by thermally conductive barriers 119. Exhaust gases from the combuster 10 pass through the hot side 114 to heat the heat transfer medium passing through the cold side 116 of the heat exchanger 42. Preferably the heat exchanger 42 will be a counter current heat exchanger where the combustion gases 8 flow in the opposite direction to the heat transfer gases 4. The heat exchanger 42 is confined within a sheet metal housing 120, and is adapted to admit the hot combuster gases thereto via an inlet manifold 122 and a conduit 123 which is coupled to the combuster 10 by a flange 124. An outlet 126 from the heat exchanger 42 conveys the spent combuster gases from the heat exchanger 42 out of the housing 50 via conduit 127 (see FIG. 6).

Figure 4:
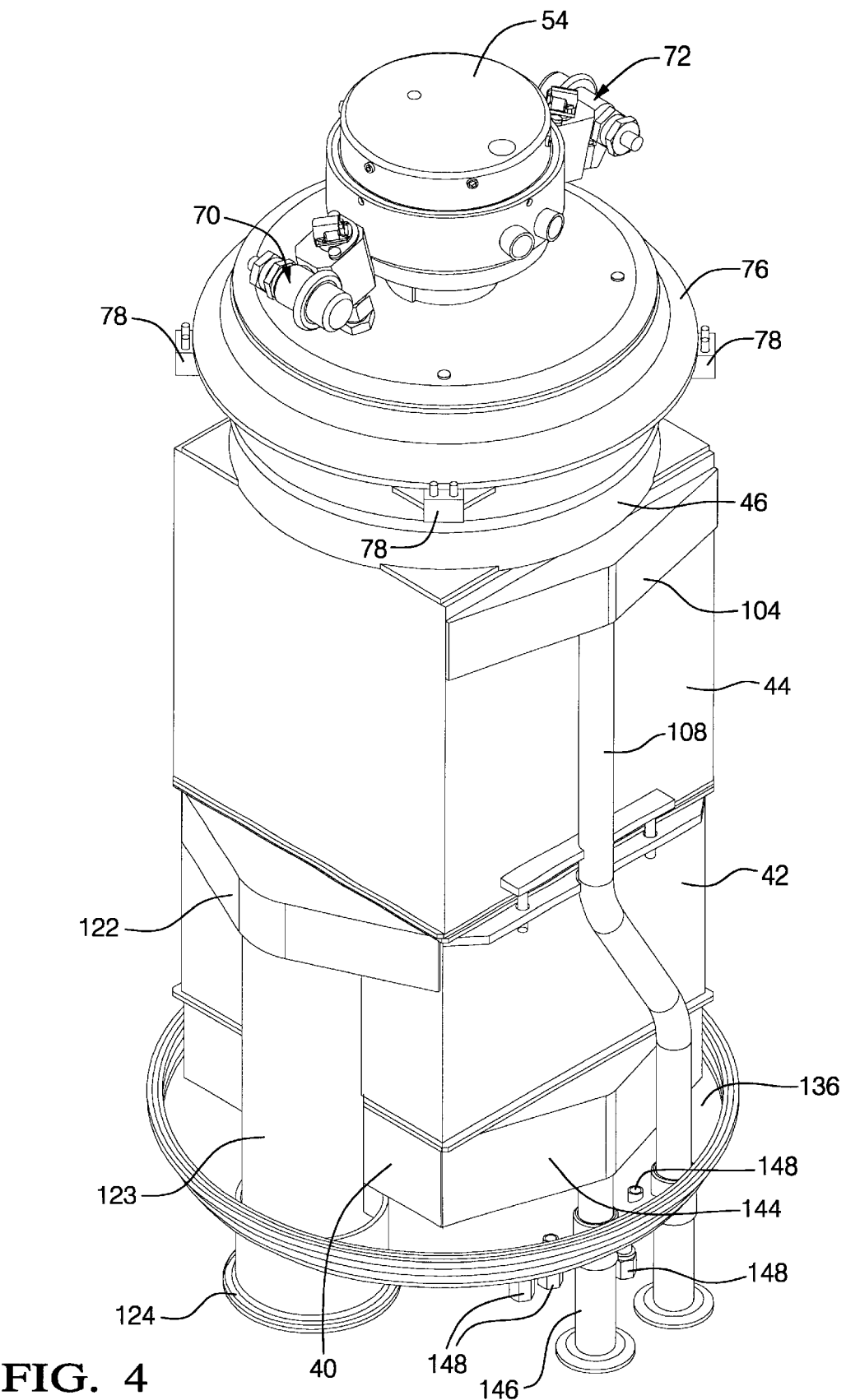
FIG. 4 is an isometric view of the innards of a fuel processor according to the present invention with the outer shell of the housing removed.
Figure 5:
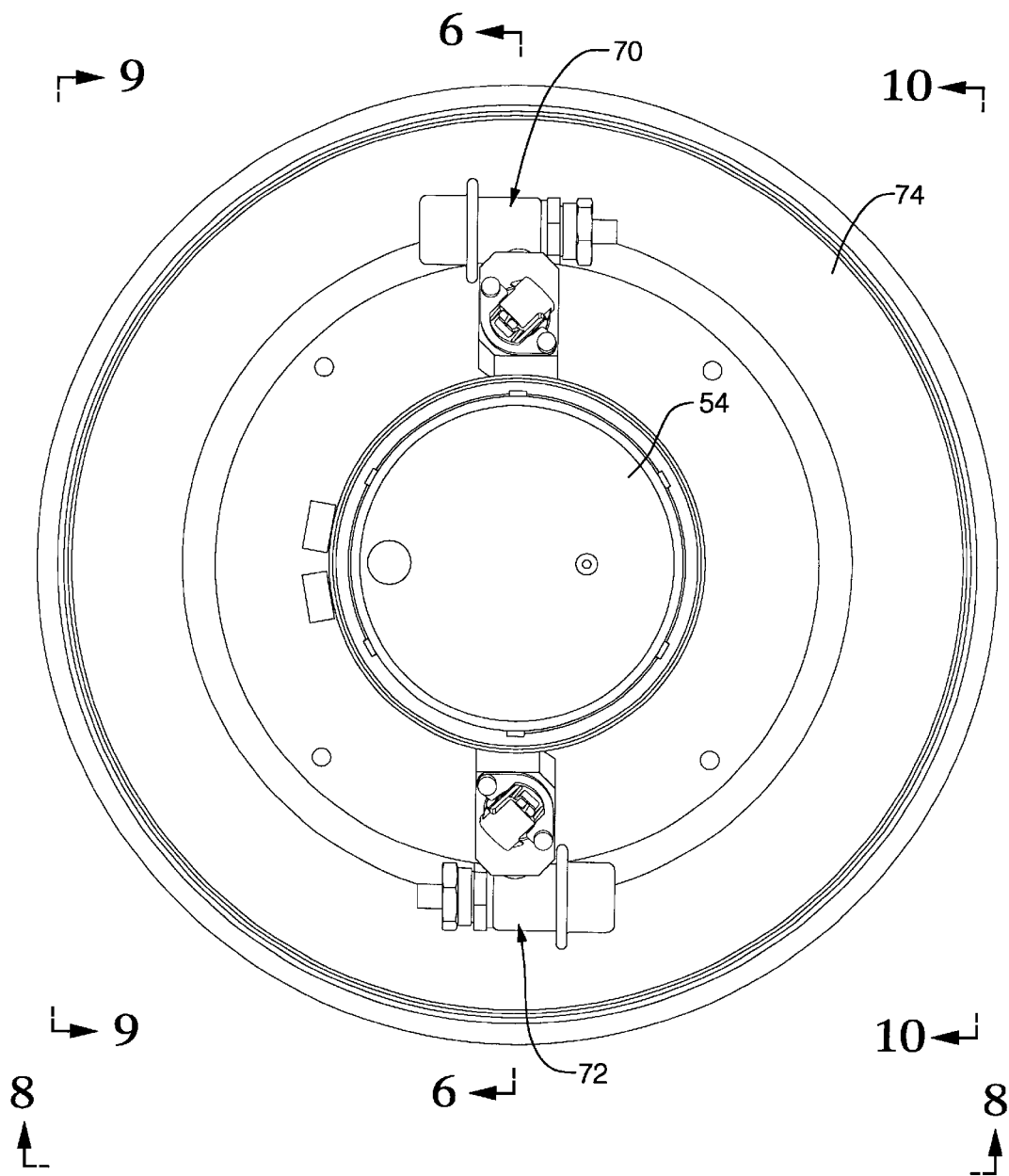
FIG. 5 is a plan view in the direction 5—5 of FIG. 3.
Figure 7:
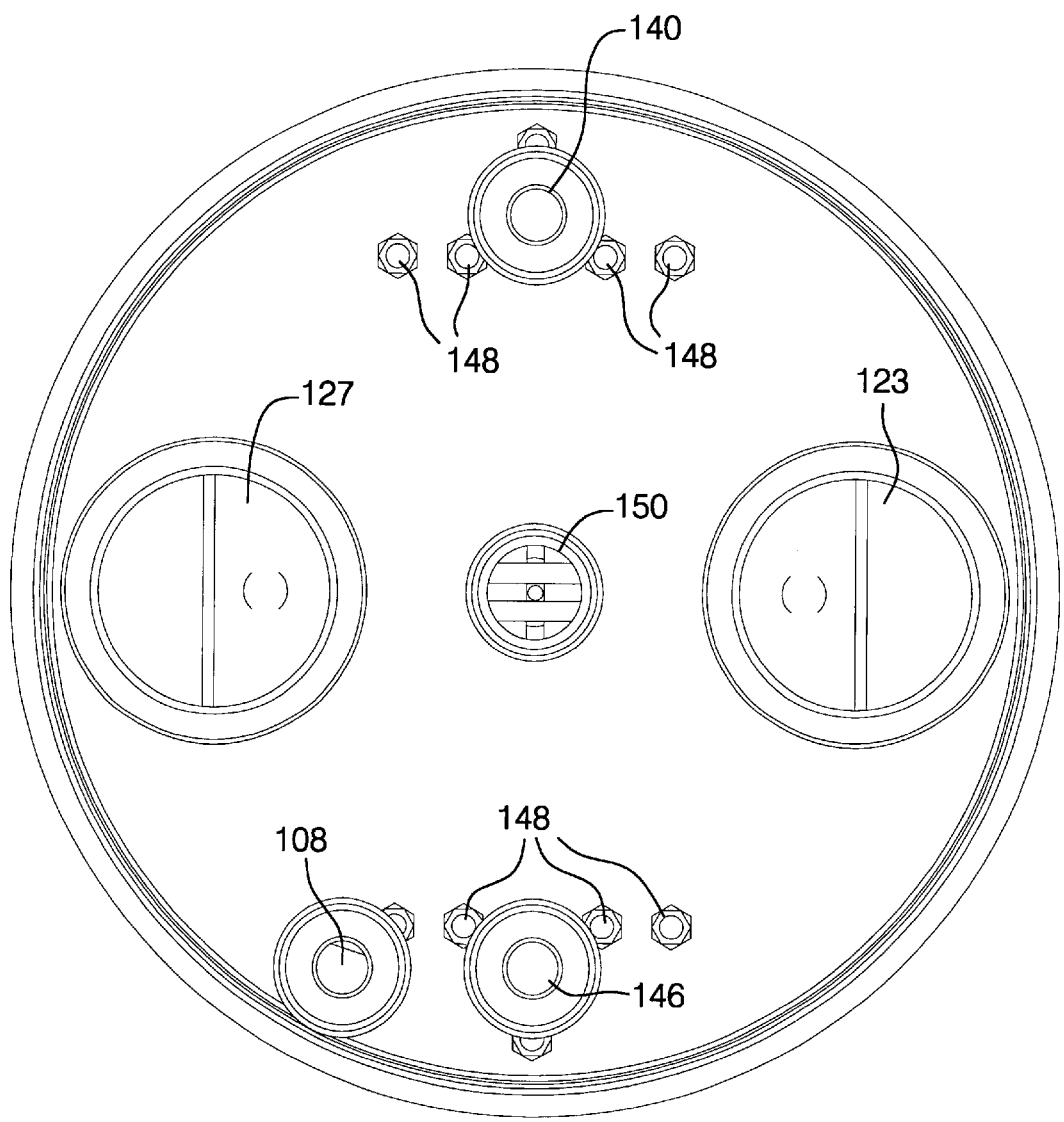
FIG. 7 is a bottom view in the direction 7—7 of FIG. 6.
Figure 8:
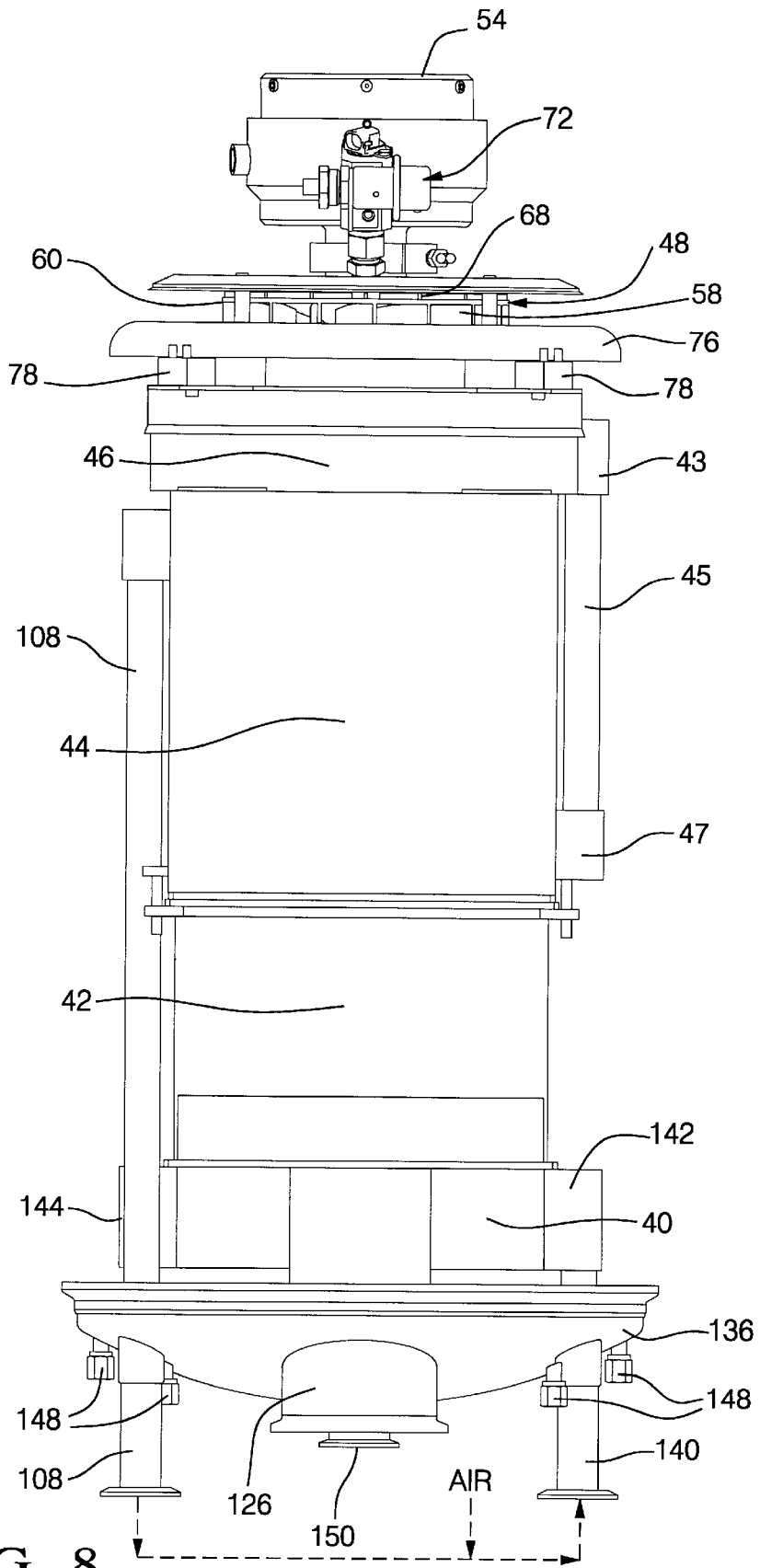
FIG. 8 is one side elevational view in the direction 8—8 of FIG. 5 (with outer shell removed)
Figure 9:
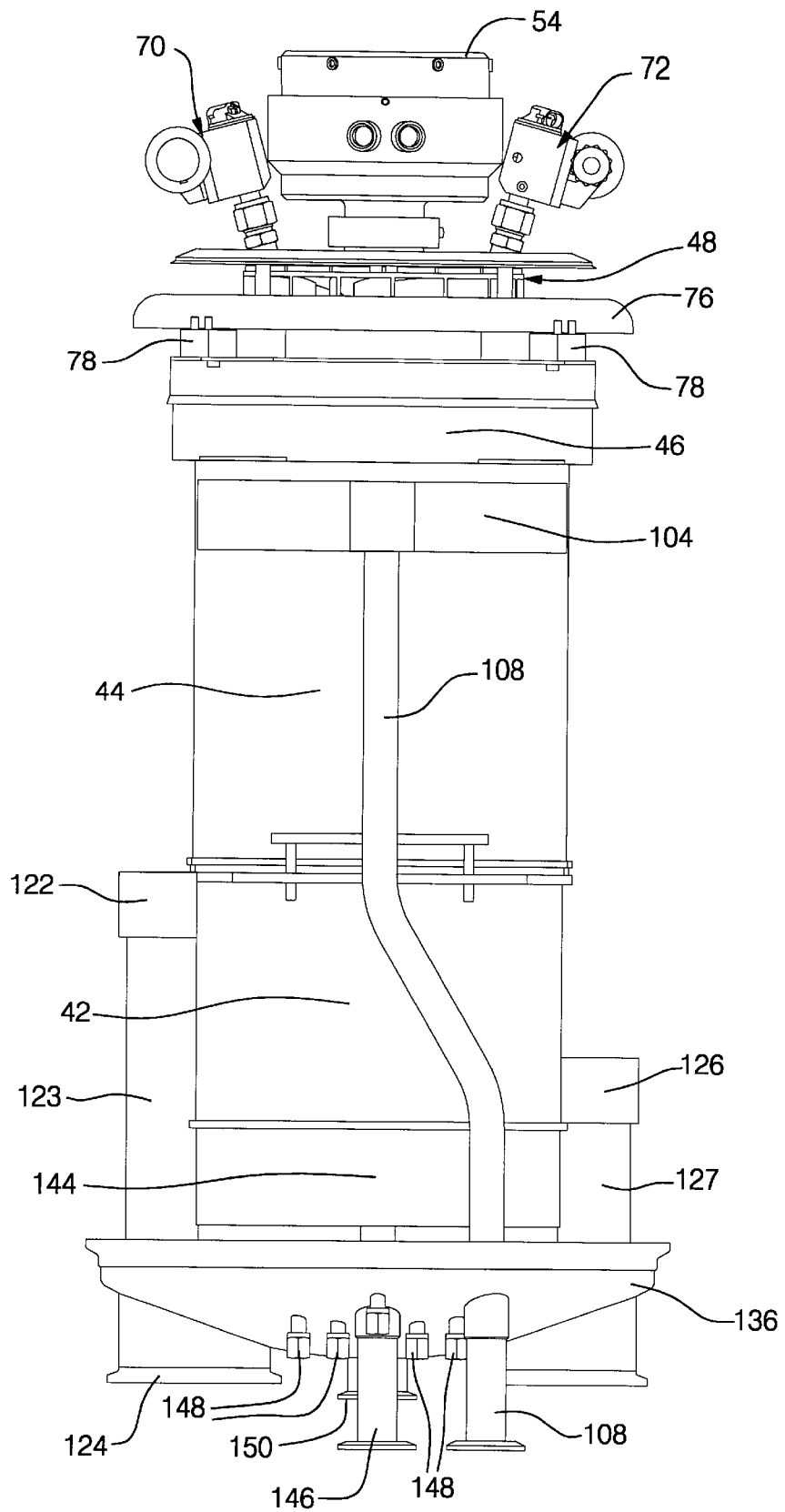
FIG. 9 is another side elevational view in the direction 9—9 of FIG. 5 (with outer shell removed)
Figure 10:
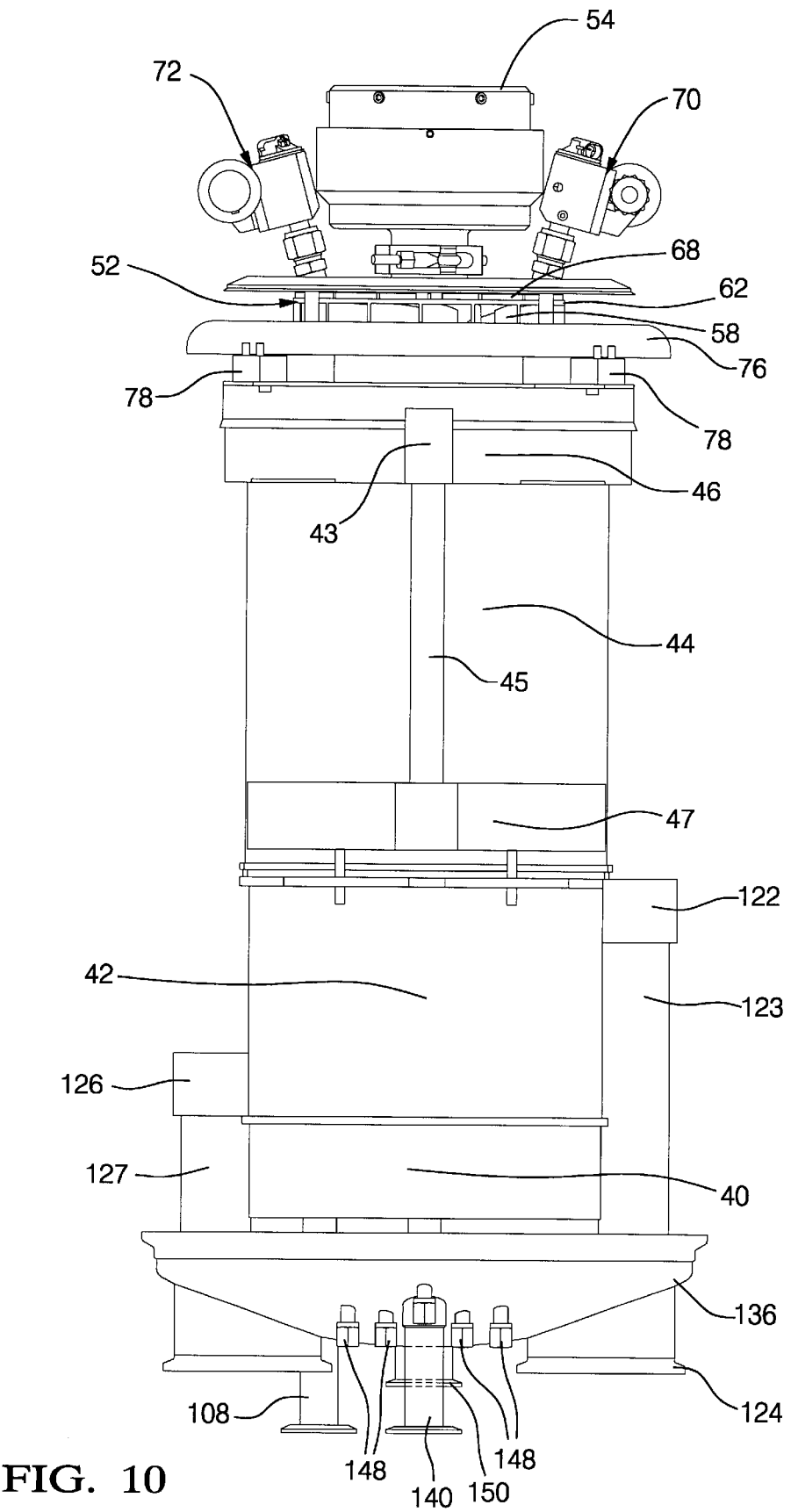
FIG. 10 is still another side elevational view in the direction 10—10 of FIG. 5 (with outer shell removed)
Figure 11:
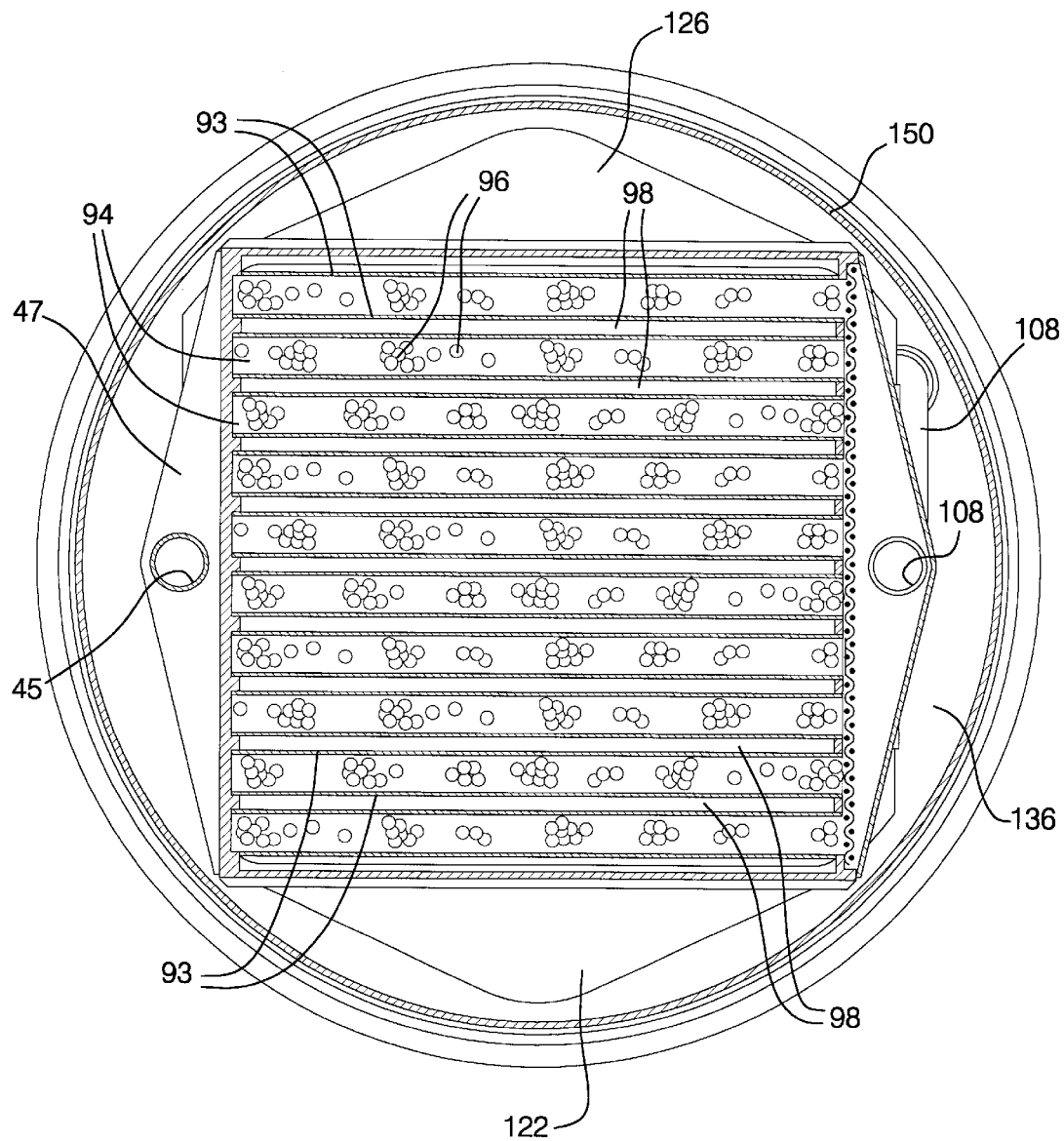
FIG. 11 is a sectioned view in the direction 11—11 of FIG. 3.
Figure 12:
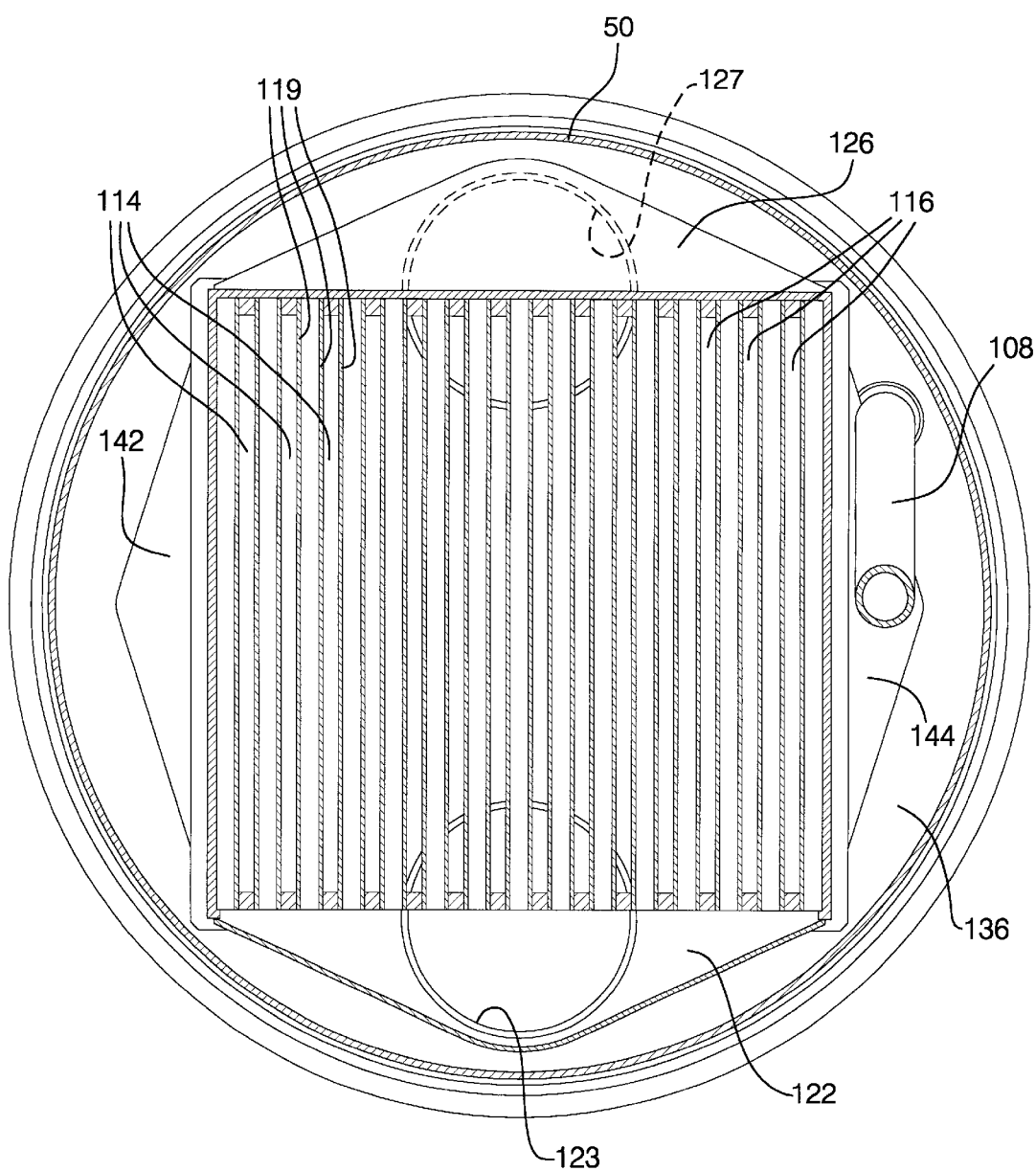
FIG. 12 is a sectioned view in the direction 12—12 of FIG. 3.
Figure 13:
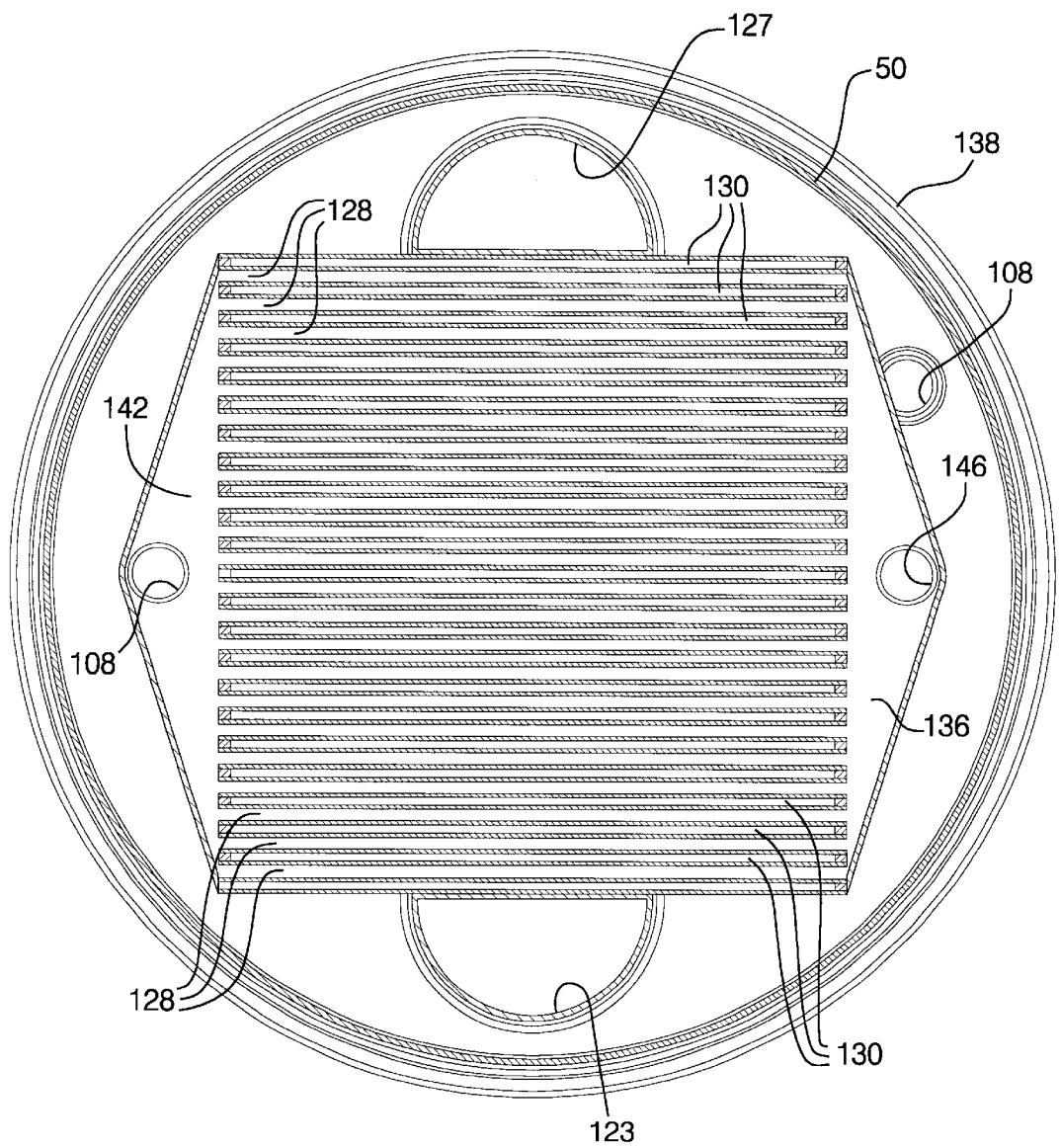
FIG. 13 is a sectioned view in the direction 13—13 of FIG. 3.

An exothermal PrOx reactor 40 is positioned downstream of the fan 48 (i.e., in the direction of medium flow), and upstream of the heat exchanger 42 from which it is separated by a mixing space 115 like the gap 113 supra. The PrOx reactor may be a bar-and-plate type cross-flow heat exchanger like that shown in FIG. 14 and has a hot side comprising a plurality of conduits 128 through which the reformate 28 exiting the first reactor 44 passes and is reacted with air to reduce the carbon monoxide content thereof. Preferably, the PrOx reactor will be configured so the reformate flows therethrough in a serpentine path like that in the reactor, but wherein the general direction of flow is counter current (i.e., opposite) to that of the heat transfer medium as depicted in FIG. 2. The hot side of the walls of the conduits 128 are coated with a suitable catalyst for promoting the PrOx reaction. The PrOx reactor 40 also has a cold side comprising a plurality of conduits 130 which are separated from the hot side by thermally conductive barriers 132 and through which the heat transfer medium circulating within the housing 50 passes and is heated before entering the inlet 134 to the heat exchanger 42. An inlet pipe 140 (FIGS. 7 and 8) directs reformate 28 from the conduit 108 into an inlet manifold 142 to the PrOx reactor 40 via a coupling (not shown) external to the housing 50. An outlet manifold 144 (FIG. 4) conducts gases treated in the PrOx reactor 40 to a PrOx exhaust tube 146. The PrOx reactor operates best in a narrow temperature range suitable for the particular catalyst used. Preferably it will operate in the range of about 210–260° C. to discourage the reverse water-gas shift reaction. By housing the PrOx reactor 40 in the housing 50 with the reactors 44 and 46 none of the valuable heat it produces is lost in external plumbing configurations.

The housing 50 is suitably sealed by closure member 136 held in place by a clamping band 138. The closure member 136 includes a number of access ports 148 through which connections are made to appropriate system monitors/sensors located at various sites throughout the housing 50 to monitor temperature or other conditions at different locations in the housing 50. The closure member 136 also includes an opening 150 adapted to receive a suitable fitting (not shown) for draining the housing and for providing blow-out protection for the housing 50 in the case of excessive pressure buildup in the housing 50.

Figure 14:
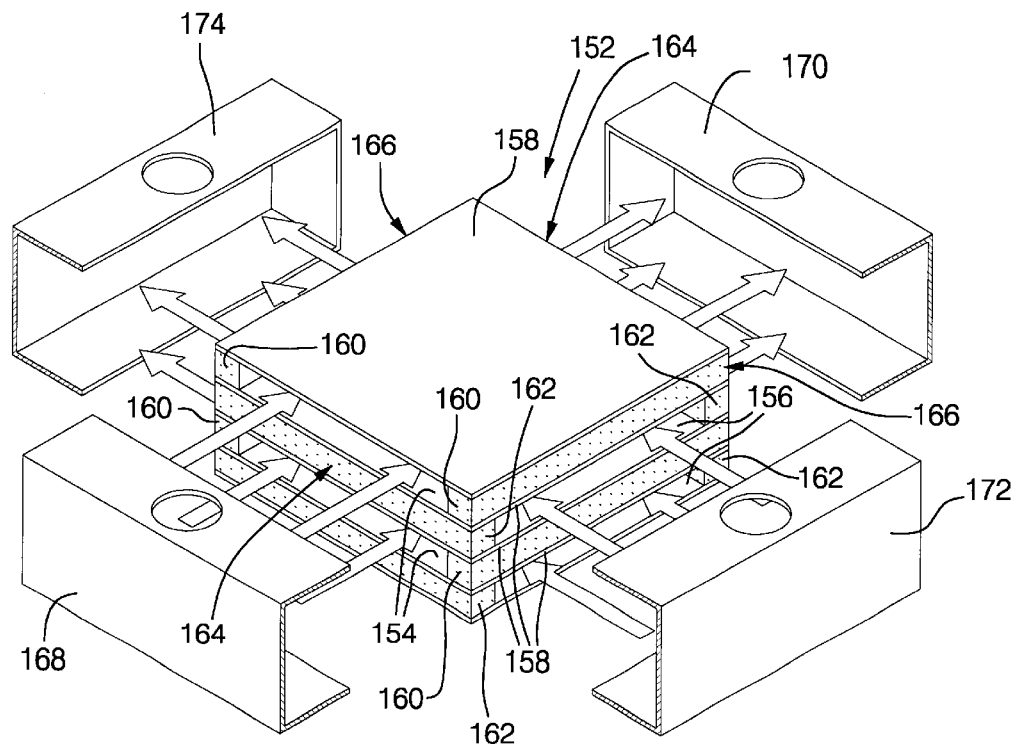
FIG. 14 is an exploded isometric illustration of a cross-flow heat exchanger/reactor.

FIG. 14 depicts a plate-and-bar cross flow heat exchanger 152 of the type that is useful in the fuel processor of the present invention, and is provided here merely to clarify what is meant by a plate-and-bar heat exchanger/reactor. The heat exchanger 152 has a hot side including a plurality of conduits 154 through which the hot, heating gas flows, and a cold side including a plurality of conduits 156 through which the colder gas to be heated flows. The hot side is separated from the cold side by a plurality of thermally conductive barriers (i.e. plates 158) which are themselves separated from each other by bars 160 and 162. The bars 160 lie along one set 164 of opposite edges of the plates 158 and define the conduits 154 forming the hot side of the heat exchanger, while the bars 162 lie along another set of opposite edges 166 of the plates 158 offset from the one set of opposite edges by ninety (90) degrees. Along a given side of the heat exchanger, the bars 160 and 162 alternate with each other in direction to provide the cross flow structure depicted. An input header/manifold 168 directs the hot/heating gases into the conduits 154 in first direction, and an exhaust header/manifold 170 collects and conveys the exhaust gases away from the heat exchanger 152. Similarly, an inlet header/manifold 172 directs the circulating heat transfer medium to be heated into the conduits 156 in a flow direction normal to the first direction, and an outlet header/manifold 174 and conveys the heated gases away from the heat exchanger 152. In the preferred embodiment of the invention described above, there is no specifically defined outlet header/manifold 174, but rather the heated medium exiting the heat exchanger 152 flows directly into the first reactor through a small gap 113 therebetween. Reactors used in the present invention can have a similar structure except will include a catalyst in that side of the heat exchanger where a reaction is to occur, ie on the cold side in the first reactor 44 and the hot side of the PrOx reactor 40.

FIG. 15 depicts a crossflow reactor 176 similar to FIG. 14, but wherein the gases to be reacted (i.e. methanol and water in the heat transfer medium) flow in a serpentine path through the reactor 176. In this regard the input and output headers/manifolds 178 and 180 for the hot/heating gases are the same as for FIG. 14, but the headers 182 and 184 for the reactant gases are narrower than the headers/manifolds 178 and 180 and do not supply/exhaust reactant from the reactor but rather only reroute the flow of gas through the reactor. Hence for example, header/manifold 182 bridges only two adjacent conduits 186 and 188, and header/manifold 184 bridges conduits 186 and 190 such that gas flowing in a first direction in conduit 190 is caused by header/manifold 184 to reverse direction as it enters conduit 186, and header/manifold 182 causes it to again reverse direction as it flows into conduit 188 and so on through out the entire reactor 176.

FIG. 16 depicts a preferred crossflow reactor 192 through which the gases 206 to be reacted (i.e. methanol and water in the heat transfer medium) flow in a serpentine path. The reactor 192 is functionally similar to that shown in FIG. 15, but structurally different in that the discrete flow-redirecting headers/manifolds 182 and 184 of FIG. 15 are eliminated. Rather, the reactor 192 comprises a housing 194 enclosing a first group of passageways 196 defined by thermally conductive plates 198 and bars 200, and through which the heat transfer medium 202 flows in a single unidirectional pass. Intermediate the passageways 196 are several legs 204'–204''' of a continuous reaction flow channel 204 through which the methanol and water to be reacted flow back and forth in serpentine fashion. The reaction flow channel 204 is formed within the housing 194 by alternating the positioning of the plates 198 such that they do not extend entirely across the full cross section of the housing 194, but rather fall short thereof so as to leave a series of gaps 208 at the ends 210 thereof through which the gases to be reacted 206 can flow and reverse direction between adjacent legs 204' 204''' of the flow channel 204. The locations of the gaps 208 are alternated from one side of the housing 194 to the next to provide a continuous elongated channel 204 having a plurality of switchbacks therein. The legs 204'–204''' and gaps 208 are filled with catalyst beads/pellets (not shown).

While the invention has been described in terms of specific embodiments thereof, it is not intended to be limited thereto, but rather only to the extent set forth hereafter in the claims which follow.

What is claimed is:

1. A thermally-integrated, fuel processor including a reformer for the two stage conversion of methanol into a $H_2$-rich fuel gas comprising:

a. a housing;

b. a fan for recirculating a gaseous heat transfer medium through said housing and back to said fan, said medium comprising first concentrations of water vapor, hydrogen, carbon dioxide and methanol vapor;

c. a water inlet to said housing for introducing water into said medium;

d. a methanol inlet to said housing for introducing methanol into said medium;

e. a heater within said housing downstream of said fan in the direction of flow of said medium for heating said medium;

f. a first reactor within said housing downstream from said heater for substantially isothermally converting a portion of said medium to a reformate gas that is exhausted from said first reactor and has second concentrations of hydrogen, and carbon dioxide greater than said first concentrations, and concentrations of said water and methanol vapors less than said first concentrations, said first reactor including a plurality of first and second channels separated each from the other by a thermally conductive partition, said first channels being adapted to receive said portion of said medium and containing a first catalyst for effecting said converting, and said second channels being adapted to receive medium heated by said heater for heating said first catalyst in said first channels;

g. a second reactor within said housing downstream from said heater, said second reactor containing a second catalyst and adapted to contact said second catalyst with said medium heated by said heater so as to react some of the water and methanol in the said medium to form said hydrogen, and carbon dioxide in said medium; and h. a shunt for diverting said portion of said medium through said first channel of said first reactor.

2. A thermally-integrated fuel processor according to claim 1 wherein said heater is a heat exchanger heated by a heating fluid.

3. A thermally-integrated fuel processor according to claim 2 wherein said second reactor is downstream of said first reactor so as to receive medium exhausted from said first reactor.

4. A thermally-integrated fuel processor according to claim 3 wherein said heating fluid comprises combustion gases formed by the combustion of methanol and/or hydrogen.

5. A thermally-integrated fuel processor including a reformer for the two stage conversion of methanol into a $H_2$-rich fuel gas comprising:

a. a housing;

b. a fan for recirculating a gaseous heat transfer medium through said housing and back to said fan, said medium comprising first concentrations of water vapor, hydrogen, carbon dioxide and methanol vapor;

c. a water inlet to said housing for introducing water into said medium;

d. a methanol inlet to said housing for introducing methanol into said medium;

e. a heater within said housing downstream of said fan in the direction of flow of said medium for heating said medium;

f. a first reactor within said housing downstream from said heater for substantially isothermally converting a portion of said medium to a reformate gas that is exhausted from said first reactor and has second concentrations of hydrogen, and carbon dioxide greater than said first concentrations, and concentrations of said water and methanol vapors less than said first concentrations, said first reactor including a plurality of first and second channels separated each from the other by a thermally conductive partition, said first channels being adapted to receive said portion of said medium and containing a first catalyst for effecting said converting, and said second channels having an inlet adapted to receive heated medium from said heater for heating said first catalyst and a first outlet for discharging said medium from said second channels;

g. a second reactor within said housing downstream from said first reactor, said second reactor containing a second catalyst and adapted to contact said second catalyst with said medium discharged from said first outlet for reacting some of the water and methanol in the heated medium to form said hydrogen, and carbon dioxide; and h. a shunt for diverting said portion of said medium through said first channels of said first reactor.

6. A thermally-integrated fuel processor including a reformer for the two stage conversion of methanol into a $H_2$-rich fuel gas comprising:

a. a housing;

b. a fan for recirculating a gaseous heat transfer medium through said housing and back to said fan, said medium comprising first concentrations of water vapor, hydrogen, carbon dioxide and methanol vapor;

c. a water inlet to said housing for introducing water into said medium;

d. a methanol inlet to said housing for introducing methanol into said medium;

e. a heat exchanger within said housing downstream of said fan in the direction of flow of said medium, said heat exchanger having a hot side including a plurality of first conduits through which a heating fluid flows, a cold side including a plurality of second conduits through which said medium flows to be heated, and a thermally conductive barrier defining said conduits and separating said hot and cold sides each from the other, said second conduits having a first inlet for receiving said medium and a first outlet for exhausting said medium from said second conduits;

f. a first reactor within said housing downstream from said heat exchanger for substantially isothermally converting a portion of said medium to a reformate gas that is exhausted from said first reactor and has second concentrations of hydrogen and carbon dioxide greater than said first concentrations, and concentrations of said water and methanol vapors less than said first concentrations, said first reactor including a plurality of first and second channels separated each from the other by a thermally conductive partition defining said channels, said first plurality of channels being adapted to receive said portion of said medium and containing a first catalyst for effecting said converting, and said second plurality of channels having a second inlet adapted to receive heated medium from said first outlet of said heat exchanger for heating said first catalyst in said first plurality of channels and a second outlet for discharging said medium from said second plurality of channels;

g. a second reactor within said housing downstream from said first reactor, said second reactor containing a second catalyst and adapted to contact said second catalyst with said medium discharged from said second channels for reacting some of said water and methanol to form said hydrogen and carbon dioxide in said medium; and h. a shunt for diverting said portion of said medium into said first channels of said first reactor.

7. A fuel processor according to claim 6 wherein (i) said housing has a central longitudinal axis, (ii) said fan, reactors and heat exchanger are aligned along said central axis, and (iii) said fan is configured and arranged so as to circulate said medium around and through said heat exchanger and reactors.

8. A fuel processor according to claim 7 wherein said fan is positioned at one end of said housing so as to draw said medium sequentially through said heat exchanger and said reactors along said central axis and discharge said medium around said reactors and heat exchanger.

9. A fuel processor according to claim 6 including a combuster fueled by methanol and/or hydrogen for generating combustion gases as said heating fluid, said combuster having an exhaust outlet coupled to said hot side of said heat exchanger for directing said combustion gases through said hot side.

10. A fuel processor according to claim 9 wherein said heat exchanger is a cross flow heat exchanger adapted to flow said medium through said cold side in a first direction and flow said combustion gases through said hot side in a second direction transverse said first direction.

11. A fuel processor according to claim 10 wherein said second direction is substantially normal to said first direction.

12. A fuel processor according to claim 6 wherein said first reactor is a cross-flow reactor in which said plurality of first channels are adapted to flow said portion through said first reactor in a third direction, and said plurality of second channels are adapted to flow said medium through said first reactor in a fourth direction transverse said third direction.

13. A fuel processor according to claim 12 wherein said fourth direction is substantially normal to said third direction.

14. A fuel processor according to claim 6 wherein said first reactor is a cross-flow reactor in which said plurality of first channels are adapted to flow said portion back and forth through said first reactor in a serpentine path, and said plurality of second channels are adapted to flow said medium through said first reactor transverse said serpentine path.

15. A fuel processor according to claim 6 wherein said water inlet and said methanol inlet are one and the same inlet.

16. A fuel processor according to claim 6 wherein said water inlet and said methanol inlet are separate inlets.

17. A thermally-integrated fuel processor including a reformer for the two stage conversion of methanol into a $H_2$-rich fuel gas comprising:
   a. a housing;
   b. a fan for recirculating a gaseous heat transfer medium comprising first concentrations of water vapor, hydrogen, carbon dioxide and methanol vapor through said housing and back to said fan, said fan comprising an impeller having a plurality of blades arranged and configured to draw said medium into the center of said impeller and discharge said medium radially outwardly from said center;
   c. a water inlet adapted to impinge water onto said impeller such that said impeller atomizes said water and expels said water into said medium as said medium discharges from said impeller;
   d. a methanol inlet adapted to impinge methanol onto said impeller such that said impeller atomizes said methanol and expels said methanol into said medium as said medium discharges from said impeller;
   e. a heat exchanger within said housing downstream of said fan for heating said medium;
   f. a first reactor within said housing downstream from said heat exchanger for substantially isothermally converting a portion of said medium to a reformate gas that is exhausted from said first reactor and has second concentrations of hydrogen and carbon dioxide greater than said first concentrations, and concentrations of said water and methanol vapors less than said first concentrations, said first reactor including a plurality of first and second channels separated each from the other by a thermally conductive partition defining said channels, said first plurality of channels being adapted to receive said portion of said medium and containing a first catalyst for effecting said converting, and said second plurality of channels having an inlet adapted to receive heated medium from said heat exchanger for heating said first catalyst in said first plurality of channels and an outlet for discharging said medium from said second plurality of channels;
   g. a second reactor within said housing downstream from said first reactor, said second reactor containing a second catalyst and adapted to contact said second catalyst with said medium discharged from said second channels for reacting said water and methanol to form said hydrogen, and carbon dioxide in said medium; and
   h. a shunt for diverting said portion of said medium into said first channels of said first reactor.

18. A thermally-integrated fuel processor according to claim 17 wherein said impeller comprises a plate having a front face, and a back face opposite said front face, said blades being on said front face and extending substantially from the center of said impeller to the perimeter of said impeller, and said water inlet and methanol inlet being configured and arranged to impinge said water and methanol onto said back face.

19. A thermally-integrated fuel processor according to claim 18 wherein said back face includes a plurality of radially extending veins upstanding from said back face.

20. A fuel processor according to claim 17 wherein said water inlet and said methanol inlet are separate inlets.

21. A fuel processor according to claim 17 wherein said water inlet and said methanol inlet are one and the same inlet.

22. A method for steam reforming methanol in stages comprising the steps of:
   a. providing a gaseous heat transfer medium comprising a first concentration of water vapor, hydrogen, carbon dioxide and methanol vapor with a housing;
   b. positioning a heater, a first catalytic reactor, and a second catalytic reactor in a common housing such that said first catalytic reactor is downstream of said heater in the direction of flow of said medium in said housing, and said second catalytic reactor is downstream of said first catalytic reactor in the direction of flow of said medium in said housing, said first catalytic reactor having a plurality of first channels containing a first catalyst, and a plurality of second channels in heat transfer relationship with said first channels, and said second catalytic reactor having a second catalyst, said first and second catalysts being suitable for promoting reaction between said water vapor and said methanol vapor;
   c. circulating said medium within said housing sequentially through said heater, said plurality of second channels, and said second catalyst;
   d. heating said circulating medium with said heater to a temperature sufficient for said medium to heat said first and second catalysts to temperatures suitable for promoting said reaction;
   e. injecting methanol and water into said circulating medium;
   f. reacting a part of said water and said methanol in said medium in a first stage reaction on said second catalyst; and
   g. diverting a portion of said medium through said first catalyst to react methanol and water in said portion in a second stage reaction to form a reformate gas that is exhausted from said first reactor and has second concentrations of hydrogen and carbon dioxide greater than said first concentrations, and concentrations of said water and methanol vapors less than said first concentrations.

23. A method according to claim 22 wherein said portion comprises up to about 25% by volume of said circulating medium.

24. A method according to claim 23 wherein said portion comprises about 5% by volume of said recirculating medium.

25. A method according to claim 22 wherein said part comprises about 20% to about 80% by weight of said water and methanol.

26. A method according to claim 25 wherein said part comprises about 50% by weight of said water and methanol.

27. A method for steam reforming methanol in stages comprising the steps of:

a. providing a gaseous heat transfer medium comprising a first concentration of water vapor, hydrogen, carbon dioxide and methanol vapor within a housing;

b. positioning a heater, a first catalytic reactor, and a second catalytic reactor in a housing such that said first and second catalytic reactors are downstream of said heater in the direction of flow of said medium in said housing, said first catalytic reactor having a plurality of first channels containing a first catalyst, and a plurality of second channels in heat transfer relationship with said first channels, and said second catalytic reactor having a second catalyst, said first and second catalysts being suitable for promoting reaction between said water vapor and said methanol vapors;

c. circulating said medium within said housing through said heater and said reactors;

d. heating said circulating medium with said heater to a temperature sufficient for said medium to heat said first and second catalysts to temperatures suitable for promoting said reaction;

e. injecting methanol and water into said circulating medium;

f. reacting a part of said water and said methanol in said medium in a first stage reaction on said second catalyst; and g. diverting a portion of said medium through said first catalyst to react the methanol and water in said portion in a second stage reaction to form a reformate gas that is exhausted from said first reactor and has second concentrations of hydrogen and carbon dioxide greater than said first concentrations, and concentrations of said water and methanol vapors less than said first concentrations.

28. A thermally integrated fuel processor for the two stage steam reforming of methanol to fuel a fuel cell comprising within a common housing (1) a heat exchanger for heating a gaseous heat transfer medium comprising first concentrations of water vapor, hydrogen, carbon monoxide, carbon dioxide and methanol, (2) a first catalytic reactor downstream from said heat exchanger and heated by said medium exiting from said heat exchanger for producing a reformate gas from said medium which is exhausted from said first reactor and is richer in hydrogen, carbon monoxide and carbon dioxide than said medium, (3) a second catalytic reactor downstream from said first reactor and heated by said medium exiting said first catalytic reactor for promoting the reaction of some of said water and methanol vapor in said medium, (4) a fan for circulating said medium through said heat exchanger, said catalytic reactors and back to said fan, and (5) a PrOx reactor for oxidizing any CO in said reformate gas with air and supplying heat to the heat transfer medium, said PrOx reactor including a reaction chamber adapted to receive air and said reformate gas, and a heat-extraction chamber separated from the reaction chamber by a thermally conductive wall, said reaction chamber containing a catalyst for promoting said oxidizing, and said heat-extraction chamber being adapted to conduct said medium therethrough for heating said medium and cooling said reaction chamber, whereby waste heat generated exothermally in said PrOx reactor is used to preheat the gaseous heat transfer medium before it enters the heat exchanger.

29. A thermally integrated fuel processor according to claim 28 wherein said catalyst is a coating on said wall confronting said reaction chamber.

30. A thermally integrated fuel processor according to claim 28 wherein said PrOx reactor is positioned upstream of said heat exchanger and said heat extraction chamber has an outlet communicating with an inlet to said heat exchanger.

31. A method of starting up a multi-stage thermally-integrated methanol reformer for fueling a fuel cell comprising a heater, a first catalytic reactor, a second catalytic reactor and a housing encasing said heater and reactors, said first catalytic reactor being downstream of said heater in the direction of flow in the heat transfer medium within said housing, and said second catalytic reactor being downstream of first catalytic reactor and said direction, said first catalytic reactor having a plurality of first channels containing a first catalyst, and a plurality of second channels in heat transfer relationship with said first channels, and said second catalytic reactor having a second catalyst, said first and second catalysts being suitable for promoting reaction between water and methanol vapors, said method comprising the steps of:

a. circulating a startup gas within said housing sequentially through said heater, said plurality of second channels, and said second catalyst;

b. heating said startup gas with said heater to a temperature sufficient for said startup gas to heat said first and second catalysts to temperatures suitable for promoting said reaction;

c. injecting methanol and water into said circulating startup gas;

d. reacting a part of said water and methanol in said startup gas in a first stage reaction on said second catalyst;

e. diverting a portion of said circulating startup gas through said first catalyst to react methanol and water in said portion in a second stage reaction to form an effluent from said housing which contains hydrogen, water vapor, carbon dioxide and said inert gas;

f. continuing steps a–e above until substantially all of said startup gas is eliminated from said effluent; and thereafter g. supplying said effluent to said fuel cell.

32. A method according to claim 31 wherein said startup gas is an inert gas.

33. A method according to claim 32 wherein said inert gas is selected from the group consisting of helium, nitrogen and argon.

34. A method according to claim 31 wherein said startup gas is selected from the group consisting of hydrogen or carbon dioxide.

* * * * *